United States Patent
Lee et al.

(10) Patent No.: US 11,751,233 B2
(45) Date of Patent: Sep. 5, 2023

(54) TECHNIQUES FOR IN-DEVICE COEXISTENCE INTERFERENCE

(71) Applicant: QUALCOMM Incorporated, San Diego, CA (US)

(72) Inventors: Hyun Yong Lee, San Diego, CA (US); Peerapol Tinnakornsrisuphap, San Diego, CA (US); Chih-Ping Li, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 127 days.

(21) Appl. No.: 17/320,517

(22) Filed: May 14, 2021

(65) Prior Publication Data

US 2022/0369320 A1 Nov. 17, 2022

(51) Int. Cl.
*H04W 72/04* (2023.01)
*H04W 72/541* (2023.01)
*H04W 72/0446* (2023.01)
*H04W 72/0453* (2023.01)
*H04W 72/21* (2023.01)
*H04W 72/23* (2023.01)

(52) U.S. Cl.
CPC ..... *H04W 72/541* (2023.01); *H04W 72/0446* (2013.01); *H04W 72/0453* (2013.01); *H04W 72/21* (2023.01); *H04W 72/23* (2023.01)

(58) Field of Classification Search
CPC ........... H04W 72/082; H04W 72/0413; H04W 72/042; H04W 72/0453; H04W 72/0446; H04W 24/08; H04W 24/02; H04M 3/2227; H04M 7/0057; H04M 3/2218; H04M 3/36; H04M 7/126; H04M 3/2263
See application file for complete search history.

(56) References Cited

U.S. PATENT DOCUMENTS

2012/0164948 A1 6/2012 Narasimha et al.
2013/0303214 A1 11/2013 Ahmadi
2018/0262233 A1* 9/2018 Laselva ................. H04L 5/0062
(Continued)

FOREIGN PATENT DOCUMENTS

WO WO-2021026857 A1 2/2021

OTHER PUBLICATIONS

International Search Report and Written Opinion—PCT/US2022/025102—ISA/EPO—dated Jul. 7, 2022.

*Primary Examiner* — Brenda H Pham
(74) *Attorney, Agent, or Firm* — Dalei Dong; Holland & Hart LLP

(57) ABSTRACT

Methods, systems, and devices for wireless communications are described. A user equipment (UE) may be configured to estimate, during a first time interval, at least one of a first interference level for a first radio access technology (RAT) caused at least in part by a second RAT, a second interference level for the second RAT caused at least in part by the first RAT, or a combination thereof. The UE may transmit a control message to a base station using the first RAT based on at least one of the first estimated interference level, the second estimated interference level, or a combination thereof. The UE may then communicate, based on the control message and during a second time interval, with the base station using the first RAT and with a wireless device using the second RAT, the second time interval being after the first time interval.

28 Claims, 18 Drawing Sheets

(56) References Cited

U.S. PATENT DOCUMENTS

| | | |
|---|---|---|
| 2018/0295637 A1 | 10/2018 | Manolakos et al. |
| 2020/0374890 A1 | 11/2020 | Wu et al. |
| 2021/0022146 A1 | 1/2021 | Hong |
| 2021/0120503 A1 | 4/2021 | Liu et al. |

* cited by examiner

TECHNIQUES FOR IN-DEVICE COEXISTENCE INTERFERENCE

FIELD OF TECHNOLOGY

The following relates to wireless communications, including techniques for in-device coexistence (IDC) interference.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless devices may be able to communicate using multiple radio access technologies (RATs) simultaneously. For example, a user equipment (UE) may be able to communicate with a base station via an NR and/or 5G link, and simultaneously communicate with augmented reality (AR) or virtual reality (VR) glasses via a Wi-Fi link. However, simultaneous communications over these respective links may result in in-device coexistence (IDC) interference at the UE, in which 5G communications interfere with the Wi-Fi communications, or vice versa.

SUMMARY

The described techniques relate to improved methods, systems, devices, and apparatuses that support techniques for estimating in-device coexistence (IDC) interference at a user equipment (UE) in advance in order to prevent the IDC interference from occurring in the first place. For example, a UE may communicate with a base station via a 5G link, and communicate with augmented reality (AR) glasses via a Wi-Fi link. In this example, the UE may use IDC interference models to predict IDC interference (e.g., interference on the Wi-Fi link caused by the 5G link, or vice versa) in advance before the UE actually experiences IDC interference. The UE may then report preferred frequency resources (e.g., resources which are not affected by the IDC interference), non-preferred frequency resources (e.g., resources affected by the IDC interference), and/or maximum transmit powers to the base station based on the predicted IDC interference so that the base station may adjust a frequency range and/or transmit power used for the 5G link in order to prevent the UE from experiencing the predicted IDC interference.

A method for wireless communication at a UE is described. The method may include estimating, during a first time interval, at least one of a first interference level for a first radio access technology (RAT) caused at least in part by a second RAT, a second interference level for the second RAT caused at least in part by the first RAT, or a combination thereof, transmitting a control message to a base station using the first RAT based on at least one of the first estimated interference level, the second estimated interference level, or a combination thereof, communicating, based on the control message, with the base station using the first RAT during a second time interval, the second time interval being after the first time interval, and communicating, based on the control message, with a wireless device using the second RAT during the second time interval.

An apparatus for wireless communication at a UE is described. The apparatus may include a processor, memory coupled with the processor, and instructions stored in the memory. The instructions may be executable by the processor to cause the apparatus to estimate, during a first time interval, at least one of a first interference level for a first RAT caused at least in part by a second RAT, a second interference level for the second RAT caused at least in part by the first RAT, or a combination thereof, transmit a control message to a base station using the first RAT based on at least one of the first estimated interference level, the second estimated interference level, or a combination thereof, communicate, based on the control message, with the base station using the first RAT during a second time interval, the second time interval being after the first time interval, and communicate, based on the control message, with a wireless device using the second RAT during the second time interval.

Another apparatus for wireless communication at a UE is described. The apparatus may include means for estimating, during a first time interval, at least one of a first interference level for a first RAT caused at least in part by a second RAT, a second interference level for the second RAT caused at least in part by the first RAT, or a combination thereof, means for transmitting a control message to a base station using the first RAT based on at least one of the first estimated interference level, the second estimated interference level, or a combination thereof, means for communicating, based on the control message, with the base station using the first RAT during a second time interval, the second time interval being after the first time interval, and means for communicating, based on the control message, with a wireless device using the second RAT during the second time interval.

A non-transitory computer-readable medium storing code for wireless communication at a UE is described. The code may include instructions executable by a processor to estimate, during a first time interval, at least one of a first interference level for a first RAT caused at least in part by a second RAT, a second interference level for the second RAT caused at least in part by the first RAT, or a combination thereof, transmit a control message to a base station using the first RAT based on at least one of the first estimated interference level, the second estimated interference level, or a combination thereof, communicate, based on the control message, with the base station using the first RAT during a second time interval, the second time interval being after the first time interval, and communicate, based on the control message, with a wireless device using the second RAT during the second time interval.

Some examples of the method, apparatuses, and non-transitory computer-readable medium described herein may further include operations, features, means, or instructions for transmitting, via the control message, an indication of a first frequency resource determined based on the first estimated interference level, the second estimated interference level, or both, where the first frequency resource includes an affected frequency resource of the first RAT which may be affected by the transmission of communications at the UE via the second RAT, or a non-affected frequency resource of the first RAT which may be not affected by the transmission of communications at the UE via the second RAT and receiving, from the base station based on the indication of the first frequency resource, control signaling indicating a second frequency resource, the second frequency resource including the first frequency resource or a different frequency resource, where communications with the base station during the second time interval may be performed based on the second frequency resource.

In some examples of the method, apparatuses, and non-transitory computer-readable medium described herein, the indication of the first frequency resource includes a bandwidth part (BWP) identifier, a identifier of a resource block region, or a combination thereof.

In some examples of the method, apparatuses, and non-transitory computer-readable medium described herein, the control signaling includes an indication for the UE to switch from a first BWP to a second BWP including the second frequency resource, or and the control signaling includes a downlink control information (DCI) message including a frequency domain resource allocation associated with the second frequency resource.

Some examples of the method, apparatuses, and non-transitory computer-readable medium described herein may further include operations, features, means, or instructions for transmitting, via the control message, an indication of a first frequency resource determined based on the first estimated interference level, the second estimated interference level, or both, where the first frequency resource includes an affecting frequency resource of the first RAT which affects the reception of communications at the UE via the second RAT, or a non-affecting frequency resource of the first RAT which does not affect the reception of communications at the UE via the second RAT and receiving, from the base station based on the indication of the first frequency resource, control signaling indicating a second frequency resource, the second frequency resource including the first frequency resource or a different frequency resource, where communications with the base station during the second time interval may be performed based on the second frequency resource.

Some examples of the method, apparatuses, and non-transitory computer-readable medium described herein may further include operations, features, means, or instructions for receiving, from the base station based on the control message, control signaling indicating a frequency resource associated with the first RAT, where communications with the base station during the second time interval may be performed based on the frequency resource, transmitting, to the base station, a second control message including an indication of a residual interference level for the first RAT caused in part by the second RAT during at least a portion of the second time interval, and receiving, from the base station in response to the indication of the residual interference level, additional control signaling indicating a modulation and coding scheme usable for communications between the UE and the base station during a third time interval subsequent to the third time interval.

In some examples of the method, apparatuses, and non-transitory computer-readable medium described herein, estimating, during the second time interval, a third interference level for the first RAT caused in part by the second RAT, a fourth interference level for the second RAT caused in part by the first RAT, or a combination thereof and transmitting, to the base station, a third control message indicating a frequency resource based on the third estimated interference level satisfying a first interference threshold, the fourth estimated interference level satisfying a second threshold interference threshold, or both.

Some examples of the method, apparatuses, and non-transitory computer-readable medium described herein may further include operations, features, means, or instructions for transmitting, via the control message, a request for the base station to modify a frequency resource associated with communications performed between the UE and the base station based on the first estimated interference level, the second estimated interference level, or both, where communicating with the base station during the second time interval may be based on the request.

In some examples of the method, apparatuses, and non-transitory computer-readable medium described herein, estimating the first interference level may include operations, features, means, or instructions for identifying a first transmission power, a first frequency resource, or both, associated with communications performed using the second RAT, identifying a second transmission power, a second frequency resource, or both, associated with communications performed using the second RAT, and estimating the first interference level, the second interference level, or both, based on the first transmission power, the first frequency resource, the second transmission power, the second frequency resource, or a combination thereof, and in accordance with one or more models for estimating IDC interference at the UE between communications associated with two or more radio access technologies.

In some examples of the method, apparatuses, and non-transitory computer-readable medium described herein, transmitting the control message may include operations, features, means, or instructions for transmitting the control message based on the first estimated interference level satisfying a first interference threshold, the second estimated interference level satisfying a second interference threshold, or both.

In some examples of the method, apparatuses, and non-transitory computer-readable medium described herein, transmitting the control message may include operations, features, means, or instructions for transmitting, via the control message, an indication of a maximum transmit power at the UE associated with communications performed via the first RAT and receiving, from the base station based on the indication of the maximum transmit power, a second control message indicating a transmit power for communications at the UE, where communications with the base station during the second time interval may be performed based on the indicated transmit power.

Some examples of the method, apparatuses, and non-transitory computer-readable medium described herein may further include operations, features, means, or instructions for receiving, from the base station, additional control signaling indicating a set of critical uplink resources associated with the first RAT, where communicating with the base station during the second time interval includes transmitting one or more uplink transmissions to the base station within the set of critical uplink resources.

In some examples of the method, apparatuses, and non-transitory computer-readable medium described herein, the one or more uplink transmissions include a sounding reference signal (SRS), a channel state information (CSI) report, or both.

Some examples of the method, apparatuses, and non-transitory computer-readable medium described herein may further include operations, features, means, or instructions for communicating with the base station using the first RAT and with the wireless device using the second RAT during a third time interval which may be prior to the first time interval, estimating, during the third time interval, a third interference level for the first RAT caused in part by the second RAT, a fourth interference level for the second RAT caused in part by the first RAT, or a combination thereof, and generating one or more models for estimating IDC interference at the UE between communications associated with two or more radio access technologies, where the estimating during the second time interval may be performed based on the one or more models.

In some examples of the method, apparatuses, and non-transitory computer-readable medium described herein, the control message includes a radio resource control (RRC) message, a medium access control-control element (MAC-CE) message, or both.

In some examples of the method, apparatuses, and non-transitory computer-readable medium described herein, the first RAT includes a New Radio (NR) access technology, a fifth generation (5G) RAT, or both, and the second RAT includes a Wi-Fi RAT, or and the first RAT includes a first 5G component carrier, and the second RAT includes a second 5G component carrier.

A method for wireless communication at a base station is described. The method may include receiving, from a UE using a first RAT and during a first time interval, a control message including an indication associated with a first estimated interference level at the UE for the first RAT caused at least in part by a second RAT, a second estimated interference level at the UE for the second RAT caused at least in part by the first RAT, or a combination thereof, transmitting control signaling to the UE using the first RAT based on the first estimated interference level, the second estimated interference level, or a combination thereof, and communicating with the UE during a second time interval after the first time interval using the first RAT and based on transmitting the control signaling.

An apparatus for wireless communication at a base station is described. The apparatus may include a processor, memory coupled with the processor, and instructions stored in the memory. The instructions may be executable by the processor to cause the apparatus to receive, from a UE using a first RAT and during a first time interval, a control message including an indication associated with a first estimated interference level at the UE for the first RAT caused at least in part by a second RAT, a second estimated interference level at the UE for the second RAT caused at least in part by the first RAT, or a combination thereof, transmit control signaling to the UE using the first RAT based on the first estimated interference level, the second estimated interference level, or a combination thereof, and communicate with the UE during a second time interval after the first time interval using the first RAT and based on transmitting the control signaling.

Another apparatus for wireless communication at a base station is described. The apparatus may include means for receiving, from a UE using a first RAT and during a first time interval, a control message including an indication associated with a first estimated interference level at the UE for the first RAT caused at least in part by a second RAT, a second estimated interference level at the UE for the second RAT caused at least in part by the first RAT, or a combination thereof, means for transmitting control signaling to the UE using the first RAT based on the first estimated interference level, the second estimated interference level, or a combination thereof, and means for communicating with the UE during a second time interval after the first time interval using the first RAT and based on transmitting the control signaling.

A non-transitory computer-readable medium storing code for wireless communication at a base station is described. The code may include instructions executable by a processor to receive, from a UE using a first RAT and during a first time interval, a control message including an indication associated with a first estimated interference level at the UE for the first RAT caused at least in part by a second RAT, a second estimated interference level at the UE for the second RAT caused at least in part by the first RAT, or a combination thereof, transmit control signaling to the UE using the first RAT based on the first estimated interference level, the second estimated interference level, or a combination thereof, and communicate with the UE during a second time interval after the first time interval using the first RAT and based on transmitting the control signaling.

Some examples of the method, apparatuses, and non-transitory computer-readable medium described herein may further include operations, features, means, or instructions for receiving, via the control message, an indication of a first frequency resource determined based on the first estimated interference level, the second estimated interference level, or both, where the first frequency resource includes an affected frequency resource of the first RAT which may be affected by the transmission of communications at the UE via the second RAT, or a non-affected frequency resource of the first RAT which may be not affected by the transmission of communications at the UE via the second RAT and transmitting, via the control signaling based on the indication of the first frequency resource, an indication of a second frequency resource, the second frequency resource including the first frequency resource or a different frequency resource, where communications with the UE during the second time interval may be performed based on the second frequency resource.

In some examples of the method, apparatuses, and non-transitory computer-readable medium described herein, the indication of the first frequency resource includes a BWP identifier, a identifier of a resource block region, or a combination thereof.

In some examples of the method, apparatuses, and non-transitory computer-readable medium described herein, the control signaling includes an indication for the UE to switch from a first BWP to a second BWP including the second frequency resource, or and the control signaling includes a DCI message including a frequency domain resource allocation associated with the second frequency resource.

Some examples of the method, apparatuses, and non-transitory computer-readable medium described herein may further include operations, features, means, or instructions for receiving, via the control message, an indication of a first frequency resource determined based on the first estimated interference level, the second estimated interference level, or both, where the first frequency resource includes an affecting frequency resource of the first RAT which affects the reception of communications at the UE via the second RAT, or a non-affecting frequency resource of the first RAT does not affect the reception of communications at the UE via the second RAT and transmitting, via the control signaling based on the indication of the first frequency resource, an indication of a second frequency resource, the second frequency resource including the first frequency resource or a different frequency resource, where communications with the UE during the second time interval may be performed based on the second frequency resource.

Some examples of the method, apparatuses, and non-transitory computer-readable medium described herein may further include operations, features, means, or instructions for transmitting, to the UE based on the control message, control signaling indicating a frequency resource associated with the first RAT, where communications with the UE during the second time interval may be performed based on the frequency resource, receiving, from the UE, a second control message including an indication of a residual interference level for the first RAT caused in part by the second RAT during at least a portion of the second time interval, and transmitting, to the UE in response to the indication of the residual interference level, additional control signaling indicating a modulation and coding scheme usable for communications between the UE and the base station during a third time interval subsequent to the second time interval.

Some examples of the method, apparatuses, and non-transitory computer-readable medium described herein may further include operations, features, means, or instructions for receiving, from the UE, a third control message indicating a frequency resource based on a third estimated interference level at the UE for the first RAT caused in part by the second RAT satisfying a first interference threshold, a fourth estimated interference level at the UE for the second RAT caused in part by the first RAT satisfying a second threshold interference threshold, or a combination thereof.

Some examples of the method, apparatuses, and non-transitory computer-readable medium described herein may further include operations, features, means, or instructions for receiving, via the control message, a request for the base station to modify a frequency resource associated with communications performed between the UE and the base station based on the first estimated interference level, the second estimated interference level, or both, where communicating with the UE during the second time interval may be based on the request.

In some examples of the method, apparatuses, and non-transitory computer-readable medium described herein, receiving the control message may include operations, features, means, or instructions for receiving the control message based on the first estimated interference level satisfying a first interference threshold, the second estimated interference level satisfying a second interference threshold, or both.

In some examples of the method, apparatuses, and non-transitory computer-readable medium described herein, receiving the control message may include operations, features, means, or instructions for receiving, via the control message, an indication of a maximum transmit power at the UE associated with communications performed via the first RAT and transmitting, to the UE based on the indication of the maximum transmit power, a second control message indicating a transmit power for communications at the UE, where communications with the UE during the second time interval may be performed based on the indicated transmit power.

Some examples of the method, apparatuses, and non-transitory computer-readable medium described herein may further include operations, features, means, or instructions for transmitting, to the UE, additional control signaling indicating a set of critical uplink resources associated with the first RAT, where communicating with the UE during the second time interval includes receiving one or more uplink transmissions from the UE within the set of critical uplink resources.

In some examples of the method, apparatuses, and non-transitory computer-readable medium described herein, the one or more uplink transmissions include an SRS, a CSI report, or both.

Some examples of the method, apparatuses, and non-transitory computer-readable medium described herein may further include operations, features, means, or instructions for transmitting, to the UE, additional control signaling indicating one or more models for estimating IDC interference at the UE between communications associated with two or more radio access technologies, where receiving the control message may be based on the one or more models.

In some examples of the method, apparatuses, and non-transitory computer-readable medium described herein, the control message includes an RRC message, a MAC-CE message, or both.

In some examples of the method, apparatuses, and non-transitory computer-readable medium described herein, the first RAT includes an NR access technology, a 5G RAT, or both, and the second RAT includes a Wi-Fi RAT, or and the first RAT includes a first 5G component carrier, and the second RAT includes a second 5G component carrier.

DETAILED DESCRIPTION

Some wireless devices may be able to communicate using multiple radio access technologies (RATs) simultaneously.

For example, a user equipment (UE) may be able to communicate with a base station via an NR and/or 5G link, and simultaneously communicate with augmented reality (AR) or virtual reality (VR) glasses via a Wi-Fi link. Communications over these respective links may result in in-device coexistence (IDC) interference at the UE, in which 5G communications interfere with the Wi-Fi communications, or vice versa. The term "IDC interference" may generally refer to interference experienced at the UE over one communication link which is caused by another communication link. According to some techniques used to address IDC interference, the UE may detect the IDC interference, and report the detected IDC interference to the base station. The base station may address the IDC interference at the UE by temporarily pausing 5G communications, switching the 5G communications to a different frequency range, or adjusting a transmit power of the 5G communications. However, these techniques require the UE to first detect the IDC interference before the IDC interference is addressed, meaning that the UE may suffer performance degradation before the IDC interference is resolved. Additionally, postponing 5G communications and/or switching 5G communications to an entirely different frequency range may result in an inefficient use of resources.

Accordingly, aspects of the present disclosure support techniques for estimating IDC interference at a UE in advance in order to prevent the IDC interference from occurring in the first place. For example, a UE may communicate with a base station via a 5G link, and communicate with AR glasses via a Wi-Fi link. In this example, the UE may use IDC interference models to predict IDC interference (e.g., interference on the Wi-Fi link caused by the 5G link, or vice versa) in advance before the UE actually experiences IDC interference. The UE may then report preferred frequency resources (e.g., resources which are not affected by the IDC interference), non-preferred frequency resources (e.g., resources affected by the IDC interference) and/or maximum transmit powers to the base station based on the predicted IDC interference so that the base station may adjust a frequency range and/or transmit power used for the 5G link in order to prevent the UE from experiencing the predicted IDC interference.

Aspects of the disclosure are initially described in the context of wireless communications systems. Additional aspects of the disclosure are described in the context of an example process flow and example flowcharts. Aspects of the disclosure are further illustrated by and described with reference to apparatus diagrams, system diagrams, and flowcharts that relate to techniques for IDC interference.

Figure 1:
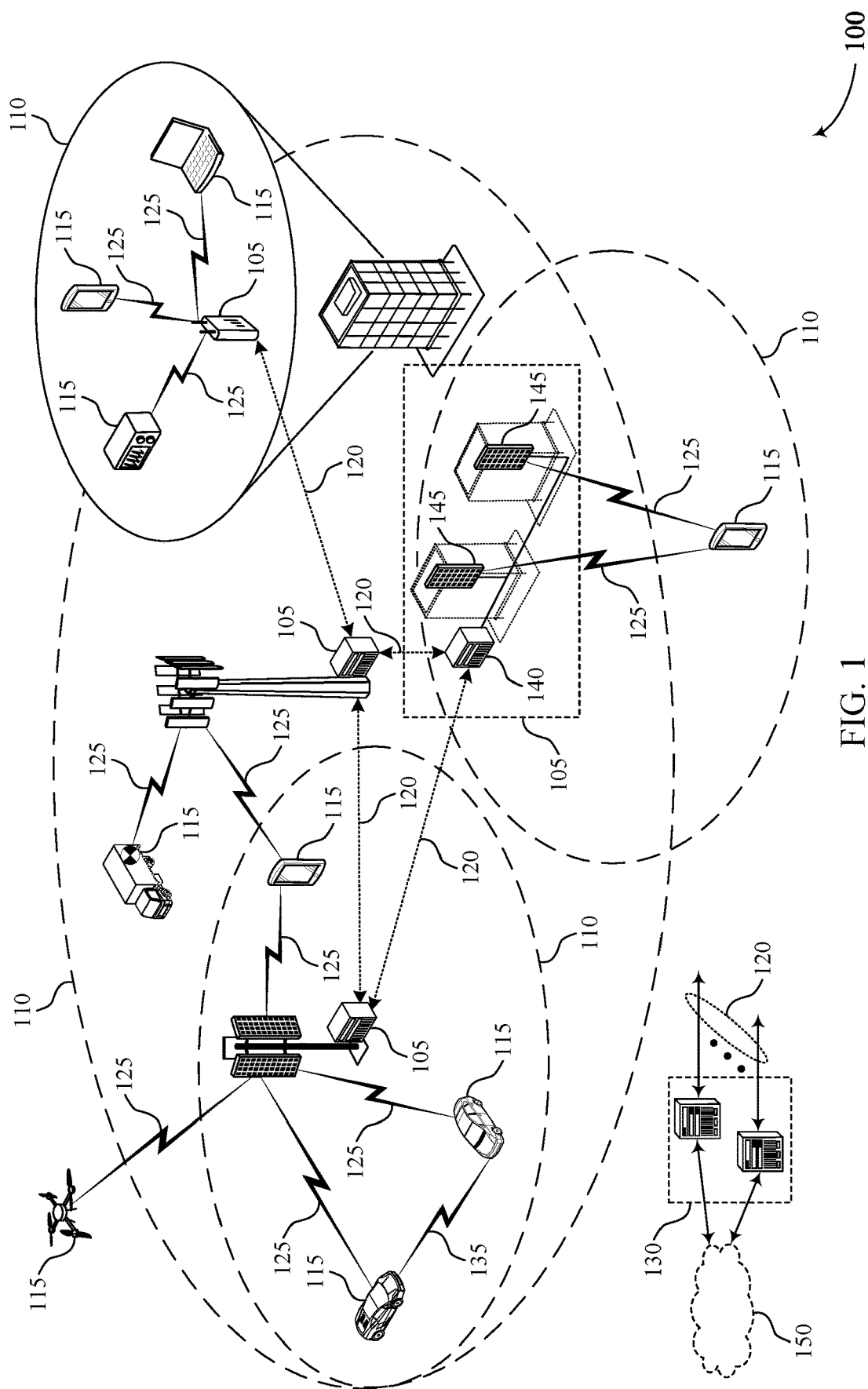
FIG. 1 illustrates an example of a wireless communications system that supports techniques for in-device coexistence (IDC) interference in accordance with various aspects of the present disclosure.

FIG. 1 illustrates an example of a wireless communications system 100 that supports techniques for IDC interference in accordance with various aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency (RF) spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (RAT)

(e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different RAT).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a respective bandwidth of the RF spectrum, and in some examples the carrier bandwidth may be referred to as a "system bandwidth" of the carrier or the wireless communications system 100. For example, the carrier bandwidth may be one of a number of determined bandwidths for carriers of a respective RAT (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a respective carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a RF spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) RAT, or NR technology in an unlicensed band such as the 5 GHz industrial, scientific, and medical (ISM) band. When operating in unlicensed RF spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support RF beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at given orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a given orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a respective receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or RF beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information (CSI) reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The UEs 115 and the base stations 105 of the wireless communications system 100 may support techniques for estimating IDC interference at a UE 115 in advance in order to prevent the IDC interference from occurring in the first place. For example, a UE 115 of the wireless communications system 100 may communicate with a base station 105 via a 5G link (e.g., communication link 125), and communicate with a wireless device 155 (e.g., AR glasses, VR glasses) via a Wi-Fi link (e.g., communication link 160). In this example, the UE 115 may use IDC interference models to predict IDC interference (e.g., interference on the Wi-Fi link caused by the 5G link, or vice versa) in advance before the UE 115 actually experiences IDC interference. The UE 115 may then report preferred frequency resources (e.g., resources which are not affected by the IDC interference), non-preferred frequency resources (e.g., resources affected by the IDC interference) and/or maximum transmit powers to the base station 105 based on the predicted IDC interference so that the base station 105 may adjust a frequency range and/or transmit power used for the 5G link (e.g., communication link 125) in order to reduce a severity of IDC interference and/or prevent the UE 115 from experiencing the predicted IDC interference.

Techniques described herein may provide for improved techniques for estimating and addressing IDC interference at a UE 115. Specifically, techniques described herein may enable a UE 115 to predict IDC interference which is expected to be experienced at the UE 115 before the UE 115 actually experiences the predicted IDC interference. In this regard, techniques described herein may enable the UE 115 to report preferred or non-preferred frequency resources and/or maximum transmit powers so that wireless communications at the UE 115 may be adjusted to prevent the anticipated IDC interference from occurring. By reducing a severity of IDC interference, or preventing IDC interference from occurring, techniques described herein may improve throughput at the UE 115 and improve resource utilization within the wireless communications system 100.

Figure 2:
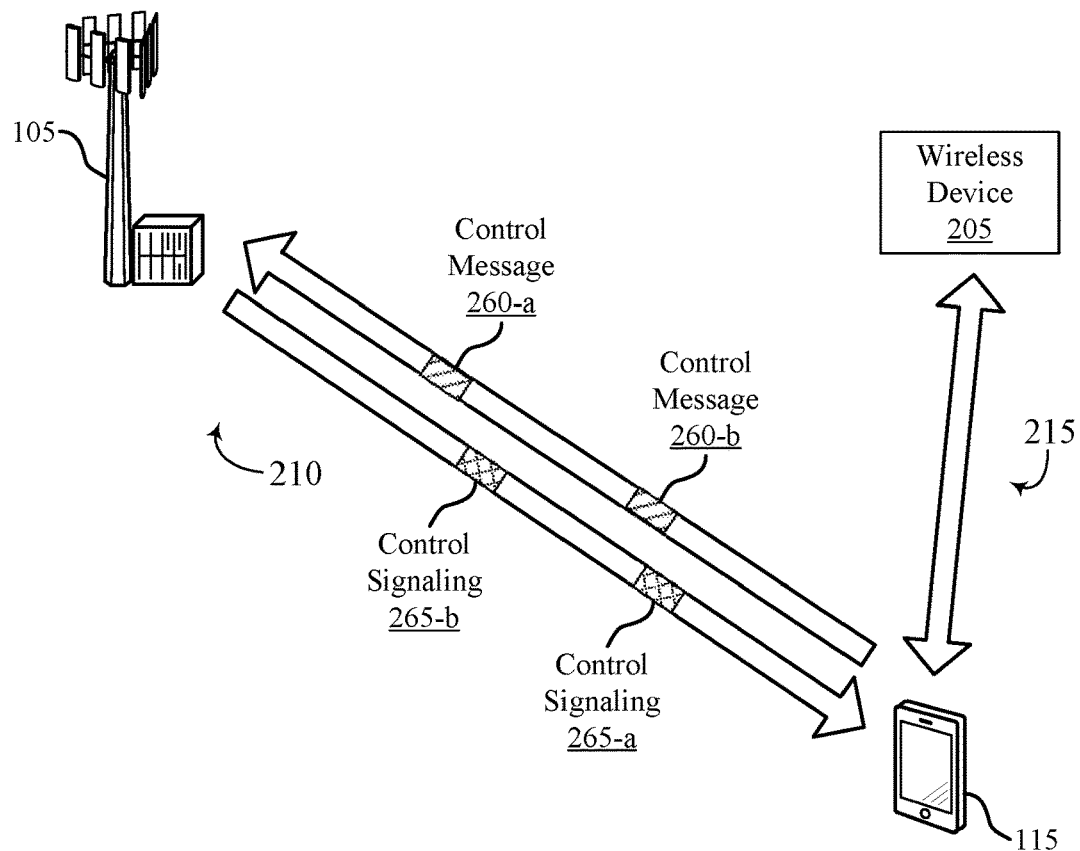
FIG. 2 illustrates an example of a wireless communications system that supports techniques for IDC interference in accordance with various aspects of the present disclosure.
Figure 2:
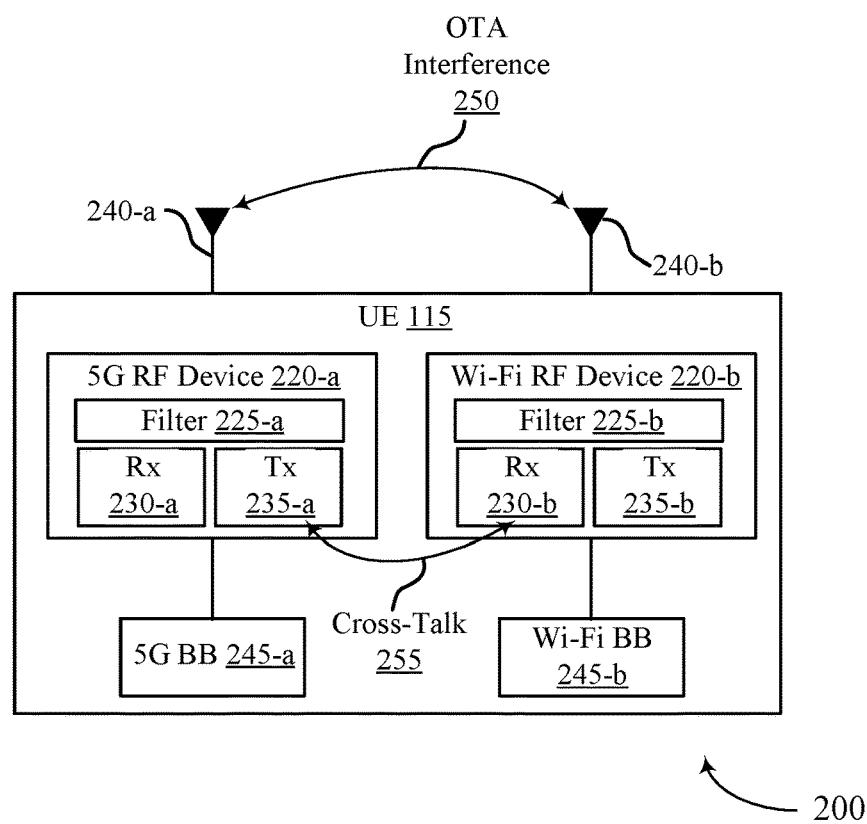

FIG. 2 illustrates an example of a wireless communications system 200 that supports techniques for IDC interference in accordance with various aspects of the present disclosure. The wireless communications system 200 may implement, or be implemented by, aspects of wireless communications system 100. The wireless communications system 200 may include a UE 115, a base station 105, and a wireless device 205, which may be examples of UEs 115, base stations 105, and other wireless devices (e.g., AR glasses, VR glasses), as described with reference to FIG. 1.

In some aspects, the UE 115 may communicate with the base station 105 using one or more beams, one or more carriers, one or more communications links, or any combination thereof. For example, the UE 115 may communicate with the base station 105 using a communication link 210. In some cases, the communication link 210 may include an example of an access link (e.g., a Uu link). The communication link 210 may include a bi-directional link that can include both uplink and downlink communication. For example, the UE 115 may transmit uplink transmissions, such as uplink control signals or uplink data signals, to the base station 105 using the communication link 210, and the base station 105 may transmit downlink transmissions, such as downlink control signals or downlink data signals, to the UE 115 using the communication link 210.

Similarly, the UE 115 may communicate with the wireless device 205 using one or more beams, one or more carriers, one or more communications links, or any combination thereof. The wireless device 205 may include, but is not limited to, AR glasses, VR glasses, and the like. For example, the UE 115 may communicate with the wireless device 205 using a communication link 215. In some cases, the communication link 215 may include an example of an Wi-Fi, Bluetooth link, or sidelink (e.g., 802.11ax link, PC5 link) between the UE 115 and the wireless device 205. The communication link 215 may include a bi-directional link to facilitate wireless communications between the UE 115 and the wireless device 205. For example, the UE 115 may messages to the wireless device 205 using the communication link 215, and the wireless device 205 may transmit messages to the UE 115 using the communication link 215.

In some implementations, the wireless communications system 200 may illustrate an environment which facilitates AR and VR applications, which may generally be referred to as "extended reality" (XR) applications. In this environment, the UE 115 may provide high-quality split-rendering services to the AR glasses (e.g., wireless device) over the 5G link (e.g., communication link 210) and the Wi-Fi link (e.g., communication link 215). In some cases, the UE 115 may facilitate simultaneous communications with the base station 105 and the wireless device 215 using different RATs. For example, the UE 115 may communicate with the base station 105 via a 5G RAT during a time interval, and may communicate with the wireless device via a Wi-Fi RAT during the same time interval.

In cases where the UE 115 communicates according to multiple RATs within the same time interval, the UE 115 may experience IDC interference. For example, 5G communications at the UE 115 may interfere with Wi-Fi transmission/reception at the UE 115. Conversely, Wi-Fi communications at the UE 115 may interfere with 5G transmission/reception at the UE 115. IDC interference may be of particular concern in cases where the UE 115 communicates according to 5G and Wi-Fi RATs in adjacent frequency channels at the same time. For instance, in Japan, 5G/NR communications may be performed in the n79 band (4.4 GHz-5.0 GHz), and 5 GHz Wi-Fi communications may be performed in the U-NII1 band (5.150 GHz-5.250 GHz). IDC interference may generally be experienced between any two adjacent channels within the same device which are used to perform communications using one or more RATs (e.g., LTE, 5G, Wi-Fi, Bluetooth, Global Navigation Satellite System (GNSS)). Further, IDC interference may be a function of the frequency over which the respective communications are performed, as well as a transmit power of the respective communications.

Left unaddressed, IDC interference may result in significant performance degradation at the UE 115, including increased latency and decreased throughput. Such performance degradation may significantly impact XR applications performed at the UE 115 and/or wireless device 205, as many XR applications are time-critical applications which require high-speed services.

IDC interference experienced at the UE 115 may include both over-the-air (OTA) interference and cross-talk interference. For example, as shown in FIG. 2, the UE 115 may include a 5G RF device 220-*a* and a Wi-Fi RF device 220-*b*, which are communicatively coupled to a 5G antenna 240-*a* and a Wi-Fi antenna 240-*b*, respectively. The 5G RF device 220-*a* and the Wi-Fi RF device 220-*b* may also be communicatively coupled one or more baseband components (e.g., 5G baseband component 245-*a*, Wi-Fi baseband component 245-*b*). The 5G RF device 220-*a* may include a filter 225-*a*, an Rx component 230-*a*, and a Tx component 235-*a*. Similarly, the Wi-Fi RF device 220-*b* may include a filter 225-*b*, an Rx component 230-*b*, and a Tx component 235-*b*. As shown in FIG. 2, signals transmitted by the 5G antenna 240-*a* may be received by the Wi-Fi antenna 240-*b*, resulting in OTA interference 250, which contributes to IDC interference experienced by the UE 115. Similarly, signals transmitted by the Wi-Fi antenna 240-*b* may be received by the 5G antenna 240-*a*, also resulting in OTA interference 250. The 5G antenna 240-*a* and the Wi-Fi antenna 240-*b* may be positioned very close to one another as compared to the distances between the UE 115 and the base station 105 and/or wireless device 205. As such, a receive strength of signals which are to be received from the base station 105 and/or wireless device 205 may be much weaker than those signals communicated between the 5G antenna 240-*a* and the Wi-Fi antenna 240-*b*, further increasing OTA interference 250.

Moreover, as shown in FIG. 2, signals generated/transmitted via the Tx component 235-*a* of the 5G RF device 220-*a* may interfere with the Rx component 230-*b* of the Wi-Fi RF device 220-*b*, thereby resulting in cross-talk interference 255 which contributes to IDC interference at the UE 115. Cross-talk interference may also be experienced between the Tx component 235-*b* and the Rx component 230-*a*. In general, the RAT which causes interference on another RAT is referred to as the "aggressor," and the RAT which experiences interference is referred to as the "victim."

If band filtering and isolation (e.g., spatial isolation between the 5G antenna 240-*a* and the Wi-Fi antenna 240-*b*) are not able to sufficiently suppress IDC interference at the UE 115 (e.g., OTA interference 250 and cross-talk-interference 255), the IDC interference may result in significant performance degradation. Additionally, high-performance band filters can be exceedingly expensive for high-frequency spectrum such as 5 GHz, so many device manufacturers are reluctant to include such filters in their UEs 115.

As noted previously herein, according to some conventional techniques used to address IDC interference, the UE 115 may detect IDC interference experienced at the UE 115 (Phase 1), and may transmit an indication of the experienced IDC interference to the base station 105 (e.g., inDeviceCoexIndication) (Phase 2). Subsequently, the base station 105 may provide a solution (e.g., adjust 5G communications) in order to reduce or eliminate the IDC experience at the UE 115 (Phase 3). For example, the base station 105 may remove the affected serving cells from the UE 115 (e.g., FDM techniques) or completely suspend 5G data traffic at the UE 115 during the affected time period (e.g., TDM techniques).

However, these techniques require the UE 115 to first detect the IDC interference, meaning that the UE 115 may suffer performance degradation (e.g., high block error rate (BLER), increased latency) before the IDC interference is resolved. Such performance degradation may severely impact real-time and near-real-time applications, such as XR applications. Moreover, each time the frequency and/or transmit power of the respective wireless connections is changed, the resulting IDC interference may also change. In other words, the IDC interference may change dynamically based on the current transmit power and bandwidth of the respective RATs/systems at the UE. As a result, current techniques for mitigating IDC interference may result in performance degradation each time the frequency and/or transmit power of a wireless connection is changed.

Additionally, postponing 5G communications and/or switching 5G communications to an entirely different frequency range may result in an inefficient use of resources. For example, using conventional techniques, the UE 115 may report an affected frequency band, and the base station 105 may suspend communications over the entirety of the bandwidth including the affected frequency band. This results in an inefficient use of resources. Moreover, 5G/NR communications utilize wider operating bandwidths as compared to 4G/LTE communications. In such cases, only a portion of the operating bandwidth may be affected by IDC interference, and suspending communications over the entire operating bandwidth may further reduce an efficiency of resource utilization.

Accordingly, wireless communications system 200 may support techniques for estimating IDC interference at the UE 115 in advance in order to prevent the IDC interference from occurring in the first place. By reducing a severity of IDC interference, or preventing IDC interference from occurring, techniques described herein may improve throughput at the UE 115 and improve resource utilization within the wireless communications system 200.

Specifically, the UE 115 of the wireless communications system 200 may be configured to estimate/predict IDC interference at the UE 115 in advance using one or more IDC interference models. The IDC interference models may include any model, table, algorithm, or other data structure which may be used to estimate interference between two or more RATs (or two or more component carriers) used for wireless communications at the UE 115. In this regard, the IDC interference models may be used to predict/estimate IDC interference for one wireless connection (or RAT) at the UE 115 which is attributable to another wireless connection (or another RAT) at the UE 115. The IDC interference models may be based on at least a frequency and a transmit power of the respective RATs/wireless connections.

For example, the UE 115 may use an IDC interference model to estimate IDC interference for the first RAT used to communicate with the base station 105 which is caused (at least in part) by the second RAT used to communicate with the wireless device 205. Similarly, by way of another example, the UE 115 may use an IDC interference model to estimate IDC interference for the second RAT which is caused (at least in part) by the first RAT. The UE 115 may use the IDC interference models to estimate/predict IDC interference based on the frequency resources and/or transmit powers of the respective RATs. In other words, the UE 115 may use the IDC interference models to predict an optimal transmission power and bandwidth of the first RAT (e.g., 5G) to avoid IDC interference to the first RAT and/or other RATs (e.g., Wi-Fi) in advance (e.g., before the IDC interference happens).

Using the one or more IDC interference models, the UE 115 may estimate/predict preferred (e.g., non-affected, non-affecting) frequency resources and/or non-preferred (e.g., affected, affecting) frequency resources of the first RAT in advance. Affecting and affected bandwidth regions may be different, as the first and second RATs (e.g., 5G, Wi-Fi) may have different band pass filters and transmit spectrum shaping.

The UE 115 may then transmit a control message 260-*a* to the base station 105, where the control message 260-*a* indicates the preferred and/or non-preferred frequency resources for the first RAT. The control message 260-*a* may additionally or alternatively indicate a transmit power (e.g., maximum transmit power) of the first RAT based on the estimated/predicted IDC interference. In some cases, the control message 260-*a* may include a request for the base station 105 to selectively adjust a frequency resource and/or transmit power of the first RAT in an attempt to reduce or eliminate predicted IDC interference.

Subsequently, the base station 105 may transmit control signaling 265-*a*, where the control signaling adjusts a frequency resource and/or transmit power of the first RAT in order to reduce/eliminate IDC interference at the UE 115. In this regard, the base station 105 may adjust a frequency resource and/or transmit power of the first RAT (e.g., 5G) in response to the control message 260-*a* to reduce IDC interference on the first RAT, and to ensure connectivity via the second RAT (e.g., Wi-Fi) at the UE 115. The UE 115 may then communicate with the base station 105 and the wireless device 205 using the first RAT and the second RAT, respectively. Specifically, the UE 115 may communicate with the base station 105 using the frequency resources and/or transmit powers indicated via the control signaling 265-*a*.

The UE 115 may be configured to continually monitor IDC interference at the UE 115, and update tables of preferred/non-preferred frequency resources. For example, upon adjusting a frequency resource and/or transmit power for the first RAT and communicating with the base station 105 via the adjusted parameters, the UE 115 may be configured to measure residual IDC interference for the first RAT and/or the second RAT. If the residual interference satisfies some threshold value, the UE 115 may transmit an additional control message 260-*b* which updates preferred/non-preferred frequency resources for the first RAT. The base station 105 may then further adjust frequency resources and/or transmit powers for the first RAT via additional control signaling 265-*b* in an attempt to further reduce or eliminate IDC interference at the UE 115.

Techniques described herein may provide for improved techniques for estimating and addressing IDC interference at the UE 115. Specifically, techniques described herein may enable the UE 115 to predict IDC interference which is expected to be experienced at the UE 115 before the UE 115 actually experiences the predicted IDC interference. In this regard, techniques described herein may enable the UE 115 to report preferred or non-preferred frequency resources and/or maximum transmit powers so that wireless communications at the UE 115 may be adjusted to prevent the anticipated IDC interference from occurring. By reducing a severity of IDC interference, or preventing IDC interference from occurring, techniques described herein may improve throughput at the UE 115 and improve resource utilization within the wireless communications system 200.

Figure 3:
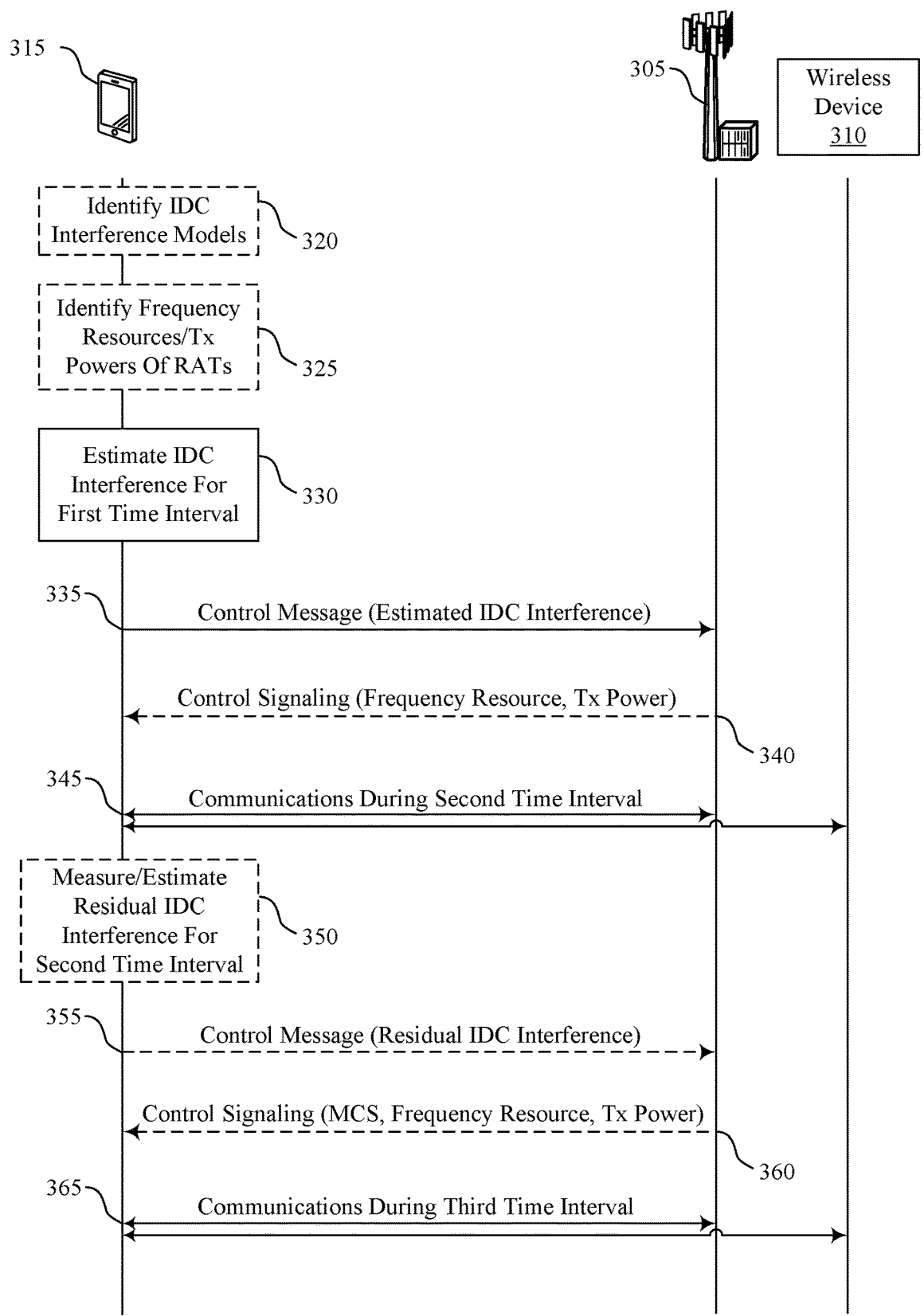
FIG. 3 illustrates an example of a process flow that supports techniques for IDC interference in accordance with various aspects of the present disclosure.

FIG. 3 illustrates an example of a process flow 300 that supports techniques for IDC interference in accordance with various aspects of the present disclosure. In some examples, process flow 300 may implement, or be implemented by, aspects of wireless communications system 100, wireless communications system 200, or both.

The process flow 300 may include a UE 315, a base station 305, and a wireless device 310, which may be examples of UEs 115, base stations 105, and wireless devices as described with reference to FIGS. 1 and 2. Specifically, the UE 315, the base station 305, and the wireless device 310 illustrated in FIG. 3 may include examples the UE 115, the base station 105, and the wireless device 205 illustrated in FIG. 2, respectively. In this regard, the wireless device 310 may include, but is not limited to, AR glasses, VR glasses, and the like.

In some examples, the operations illustrated in process flow 300 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At 320, the UE 315 may identify one or more IDC interference models used for estimating IDC interference at the UE 115. The IDC interference models may include any model, table, algorithm, or other data structure which may be used to estimate interference between two or more RATs (or two or more component carriers) used for wireless communications at the UE 315. In this regard, the IDC interference models may be used to predict/estimate IDC interference for one wireless connection (or RAT) at the UE 115 which is attributable to another wireless connection (or another RAT) at the UE 115. The IDC interference models may be based on at least a frequency and a transmit power of the respective RATs/wireless connections.

For example, the UE 315 may be configured to communicate with the base station 305 via a first RAT (e.g., 5G, NR), and may be configured to communicate with the wireless device 310 via a second RAT (e.g., Wi-Fi). In this example, the one or more IDC interference models may be used to estimate/predict interference over the 5G/NR connection which is attributable to the Wi-Fi connection, and vice versa. Similarly, by way of another example, the UE 315 may be configured to communicate with the base station 305 and the wireless device 310 via a first component carrier (e.g., first RAT) and a second component carrier (e.g., second RAT), respectively. In this example, the IDC interference models may be used to estimate/predict interference over the first component carrier which is attributable to communications performed over the second component carrier, and vice versa.

In some implementations, the one or more IDC interference models may be pre-configured at the UE 115. For example, the IDC interference models may be based on hardware specifications of the UE 315 (e.g., band-pass filters, circuit isolation, antenna isolation), and may thereby be pre-configured at the UE 315 without explicit signaling from the base station 305. Additionally, or alternatively, the one or more IDC interference models may be signaled to the UE 315 by the base station 305 (e.g., via RRC signaling). Moreover, in some cases, the UE 315 may be configured to generate the one or more IDC interference models. Specifically, the UE 315 may be configured to generate the IDC interference models based on previous communications performed at the UE 315. For example, the UE 315 may communicate with the base station 305 via a first RAT (e.g., 5G, NR), and may simultaneously communicate with the wireless device 310 via a second RAT (e.g., Wi-Fi). In this example, the UE 315 may measure IDC interference over the first RAT which is caused by the second RAT, and vice versa, and may generate IDC interference models based on the measured IDC interference.

At 325, the UE 315 may identify parameters associated with RATs and/or wireless connections used to communicate with the base station 305 and the wireless device 310. Parameters associated with the respective RATs/wireless connections may include frequency resources, transmit powers, or both. For example, the UE 315 may identify a first frequency resource and a first transmit power associated with communications performed using a first RAT configured for communications with the base station 305. Similarly, the UE 315 may identify a second frequency resource and a second transmit power associated with communications performed using a second RAT configured for communications with the wireless device 310. The UE 315 may identify the frequency resources and transmit powers at 325 based on identifying the IDC interference models at 320.

At 330, the UE 315 may estimate (e.g., predict) IDC interference at the UE 315 during a first time interval. Specifically, the UE 315 may be configured to estimate IDC interference prior to the UE 315 ever experiencing the estimated/predicted IDC interference. That is, the UE 315 may estimate the IDC interference in advance before performing communications which may cause the IDC interference. In this regard, the first time interval during which the IDC interference is estimated at 330 may occur prior to a second time interval during which the UE 315 may actually experience IDC interference. For example, the UE 315 may estimate the IDC interference at 330 prior to establishing wireless connections with the base station 305, the wireless device 310, or both. The UE 315 may estimate the IDC interference using the one or more IDC interference models identified at 320. Moreover, the UE 315 may estimate the IDC interference based on the frequency resources and transmit powers of the respective RATs which were determined at 325.

For example, the UE 315 may estimate a first interference level associated with a first RAT (e.g., first RAT used to communicate with the base station 305) which is caused (at least in part) by a second RAT (e.g., second RAT used to communicate with the wireless device 310). Additionally, or alternatively, the UE 315 may estimate a second interference level associated with the second RAT which is caused (at least in part) by the first RAT. In these examples, the estimated IDC interference levels may be based on the frequency resources and transmit powers of the first RAT and the second RAT, respectively. Moreover, the UE 315 may estimate the first interference level and/or the second interference level using (e.g., in accordance with) one or more IDC interference models.

At 335, the UE 315 may transmit a control message to the base station 305 based on (e.g., in response to) estimating/predicting IDC interference at the UE 315 at 330. The control message may include an RRC message (e.g., RRC IE message), a MAC-CE message, or both. The UE 315 may transmit the control message to the base station 305 using the first RAT (e.g., 5G, NR). The UE 315 may transmit the control message at 335 based on identifying the IDC interference models at 320, identifying frequency resources and/or transmit powers of the respective RATs at 325, estimating the IDC interference at 330, or any combination thereof.

The UE 315 may transmit the control message at 335 based on the first interference level for the first RAT caused by the second RAT (e.g., victim=first RAT), based on the second interference level for the second RAT caused by the first RAT (e.g., victim=second RAT), or both. For example, in some cases, the UE 315 may transmit the control message based on the first interference level and/or the second interference level satisfying (e.g., being greater or equal to) one or more interference thresholds. The respective RATs may be associated with the same or different interference thresholds used to trigger transmission of the control message.

In some implementations, the UE 315 may transmit the control message in order to reduce or eliminate estimated/predicted IDC interference. Specifically, the control message may include a request for the base station 305 to adjust a frequency and/or transmit power associated with the first RAT used for communications between the UE 315 and the base station 305. For example, the control message may include a request for the base station 305 to modify a frequency resource used for communications performed between the UE 315 and the base station 305 in order to reduce or eliminate IDC interference experienced over the first RAT or the second RAT. By way of another example, the UE 315 may determine a maximum transmit power for the first RAT which may help reduce or eliminate IDC interference at the UE 315, and may indicate the maximum transmit power (e.g., preferred-Max) via the control message.

In some aspects, the control message may indicate frequency resources associated with the first and/or second RAT which are affected or not affected by IDC interference (e.g., affected/non-preferred frequency resources, non-affected/preferred frequency resources). Moreover, the control message may indicate frequency resources associated with the first and/or second RAT which do or do not cause the estimated IDC interference (e.g., affecting/non-preferred frequency resources, non-affecting/preferred frequency resources). Affected, non-affected, affecting, and non-affecting frequency resources may be indicated via BWP identifiers (e.g., BWP IDs), identifiers of resource block regions (e.g., physical resource block (PRB) regions, PRB RIVs), resource bitmaps, LCIDs (e.g., eLCIDs), or any combination thereof. For example, affected frequency resources may be indicated via affectedPRB indicators and/or affectedBWPId indicators, and affecting frequency resources may be indicated via affectingPRB indicators and/or affectingBWPId indicators. Moreover, non-affected frequency resources and/or non-affecting frequency resources may be indicated via preferredPRB indicators and/or preferredBWPId indicators.

For example, in cases where the first RAT is the victim (e.g., first RAT suffers IDC interference caused by the second RAT), the control message may indicate frequency resources associated with the first RAT which are affected by the IDC interference (e.g., affected frequency resources, or non-preferred frequency resources), frequency resources associated with the first RAT which are not affected by the IDC interference (e.g., non-affected frequency resources, or preferred frequency resources), or both. In this regard, in cases where the first RAT is the victim, the control message may indicate frequency resources (e.g., BWP IDs, PRB regions) of the first RAT which are or are not affected by communications (e.g., transmission/reception) at the UE 315 performed using the second RAT.

By way of another example, in cases where the second RAT is the victim (e.g., second RAT suffers IDC interference caused by the first RAT), the control message may indicate frequency resources associated with the first RAT which cause the IDC interference (e.g., affecting frequency resources, or non-preferred frequency resources), frequency resources associated with the first RAT which do not cause the IDC interference (e.g., non-affecting frequency resources, or preferred frequency resources), or both. In this regard, in cases where the first RAT is the aggressor, the control message may indicate frequency resources (e.g., BWP IDs, PRB regions) of the first RAT which do or do not affect communications (e.g., transmission/reception) at the UE 315 performed using the second RAT.

The control message at 335 may include additional information (e.g., UEAssistanceInformation) associated with estimated IDC interference, including an a list of affected frequency carriers (e.g., AffectedCarrierFreqList), absolute RF channel number (ARFCN) indicators (e.g., ARFCN-ValueNR), indications of a direction of the predicted IDC interference (e.g., interferenceDirection{NR, other, both, spare}), and the like. In cases where the second RAT includes a second 5G component carrier, the control message at 335 may also include ARFCN indicators (e.g., ARFCN-ValueNR) or cell index of the second 5G component carrier.

At 340, the UE 315 may receive control signaling from the base station 305 based on (e.g., in response to) the control message at 335. In some implementations, the base station 305 may transmit the control signaling in order to adjust one or more parameters (e.g., frequency resource, transmit power) associated with the first RAT in an attempt to reduce or eliminate IDC interference at the UE 315. Specifically, the control signaling may include a downlink control information (DCI) message including frequency domain resource allocation (FDRA) information which indicates frequency resources which are to be used for subsequent communications over the first RAT.

For example, in cases where the UE 315 indicates affected frequency resources of the first RAT (e.g., frequency resources which suffer IDC interference), affecting frequency resources of the first RAT (e.g., frequency resources which cause IDC interference), or both, the control signaling may indicate a different frequency resource which is to be used for communications using the first RAT. In other words, the base station 305 may remove the affected and/or affecting frequency resource from a set of resources used for communications using the first RAT in order to reduce or eliminate estimated/predicted IDC interference. In some aspects, the control signaling may adjust a frequency resource used for communications using the first RAT (e.g., reduce the active downlink and/or uplink BWP of the UE 315) by instructing the UE 315 to switch from a first BWP to a second BWP, or via DCI FDRA, starting from some slot or other time period after the base station 305 acknowledges the control message. For instance, if the control message indicates a first frequency resource of the first RAT which is affected by IDC interference, the control signaling may indicate for the UE 315 to switch from a first BWP including the first frequency resource to a second BWP including a second frequency resource which is not affected by IDC interference.

Conversely, in cases where the UE 315 indicates non-affected frequency resources of the first RAT (e.g., frequency resources which do not suffer IDC interference), non-affecting frequency resources of the first RAT (e.g., frequency resources which do not cause IDC interference), or both, the control signaling may indicate a for the UE 315 to use the non-affecting and/or non-affected frequency resource for communications over the first RAT. In other words, the control signaling may indicate that subsequent communications using the first RAT will be performed using the non-affecting and/or non-affected frequency resource(s).

In some aspects, the UE 315 may be able to use portions of an active bandwidth region (e.g., active BWP) which are not affected by IDC interference. In other words, the control signaling may instruct the UE 315 to use a portion of the active bandwidth region of the first RAT which is not affected (or does not cause) IDC interference. As such, the UE 315 may be able to use non-affected bandwidth regions to maintain data transfer. Frequency resources which are indicated via the control signaling may be indicated via BWP identifiers (e.g., BWP IDs), identifiers of resource block regions (e.g., PRB regions), and the like.

Additionally, or alternatively, the control signaling may include an indication for the UE 315 to adjust a transmit power associated with communications using the first RAT. The control signaling may adjust a transmit power at the UE 315 associated with communications using the first RAT in order to reduce or eliminate estimated/predicted IDC interference. In some aspects, the control signaling may indicate a transmit power (e.g., uplink transmit power) for communications at the UE 315 using the first RAT based on an indication of a transmit power (e.g., maximum transmit power) indicated in the control message at 335. In this regard, the base station 305 may be configured to adjust (e.g., reduce) a maximum transmit power at the UE 315 in order to reduce/eliminate (e.g., avoid) IDC interference by P-Max or closed-loop power control (CLPC) techniques.

At 345 the UE 315 may communicate with the base station 305 and the wireless device 310 during a second time interval which is subsequent to the first time interval. In other words, the communications at 345 may be performed subsequent to estimating/predicting IDC interference at 330. Specifically, the UE 315 may communicate with the base station 305 and the wireless device 310 using the first RAT and the second RAT, respectively. In some aspects, the UE 315 may perform the wireless communications at 345 based on the control message at 335, the control signaling at 340, or both. Additionally, or alternatively, the UE 315 may perform the wireless communications at 345 based on identifying the IDC interference models at 320, identifying the frequency resources and/or transmit powers of the respective RATs at 325, estimating the IDC interference at 330, or any combination thereof.

In some aspects, the UE 315 may communicate with the base station 305 and the wireless device 310 based on (e.g., using, in accordance with) frequency resources and/or transmit powers for the respective RATs which were indicated via the control signaling at 340. For example, in cases where the control signaling indicates a new frequency resource which is to be used for wireless communications over the first RAT (e.g., indicates for the UE 315 to switch BWPs), the UE 315 may communicate with the base station 305 within the indicated frequency resource. Similarly, in cases where the control signaling indicates a transmit power (e.g., uplink transmit power) for communications over the first RAT, the UE 315 may communicate with the base station 305 using the first RAT and the indicated transmit power.

In some aspects, the UE 315 may be configured to perform communications (e.g., transmit uplink messages/transmissions) within a set of critical uplink resources for the first RAT. In other words, the UE 315 may be configured to perform the communications with the base station 305 in accordance with an autonomous denial configuration for the first RAT. Autonomous denial configurations may enable the UE 315 to refrain from transmitting some uplink resources (e.g., uplink subframes), even when the uplink resources are scheduled for uplink transmissions by the base station 305. Parameters for autonomous denial configurations may include autonomousDenial Slots, autonomousDenialValidity indicators, and the like. However, some uplink resources may include "critical uplink resources" which are critical (e.g., important, required) for overall system performance of the first RAT, and which may not be skipped/autonomously denied by the UE 315. Critical uplink resources may include uplink resources for SRSs (e.g., SRSs used for channel reciprocity), uplink resources for CSI reports or other CSI information (e.g., physical uplink control channel (PUCCH) messages including CSI information, such as RI and PMI). As such, the UE 315 may be able to perform autonomous denial (e.g., refrain from transmitting uplink messages) for non-critical uplink resources, but may be required to perform uplink transmissions (e.g., unable to perform autonomous denial) for critical uplink resources. Thus, the base station 305 may indicate a list of uplink signals (e.g., critical uplink resources) that the UE 315 must transmit to the network due to significant performance effect when the UE 315 is configured with autonomous denial.

For example, the UE 315 may receive control signaling from the base station 305 (e.g., control signaling at 340 and/or additional control signaling) which indicates a set of critical uplink resources associated with the first RAT. In this regard, the control signaling may indicate a set of uplink resources which may not be autonomously denied by the UE 315 (e.g., critical uplink resources). Critical uplink resources may be indicated via mandatory resource identifiers (e.g., mandatoryResourceId, mandatorySRS-ResourceId, mandatoryPUCCH-ResourceId). In this example, the UE 315 may communicate with the base station 305 at 345 by transmitting one or more uplink transmissions (e.g., SRSs, CSI reports) within the indicated set of critical uplink resources.

At 350, the UE 315 may measure/estimate IDC interference at the UE 315 for the second time interval. In other words, the UE 315 may measure IDC interference at the UE 315 based on performing the communications during the second time interval at 345. Specifically, the UE 315 may measure IDC interference for the first RAT which is attributable to the second RAT, IDC interference for the second RAT which is attributable to the first RAT, or both. In some implementations, some residual IDC ground interference may still be experienced at the UE 315 after the base station 305 adjusts frequency resources and/or transmit powers for the first RAT via the control signaling at 340. As such, IDC interference measured/estimated at 350 may be referred to as residual IDC interference.

In some aspects, by measuring residual IDC interference during the second time interval, the UE 315 may be configured to continually update preferred and non-preferred frequency resources for the first and second RATs. That is, the UE 315 may be configured to update a table or other data structure with preferred frequency resources (e.g., non-affecting frequency resources, non-affected frequency resources) and/or non-preferred frequency resources (e.g., affecting frequency resources, affected frequency resources) of the first RAT based on the measured residual IDC interference. Moreover, the UE 315 may be configured to update a maximum transmit power for the first RAT and/or the second RAT based on the measured residual IDC interference.

At 355, the UE 315 may transmit a control message to the base station 305 (e.g., via the first RAT) based on performing the communications during the second time interval at 345. In some aspects, the control message may include an indication of the residual IDC interference which was measured/estimated at 350. Specifically, the UE 315 may be configured to transmit the control message at 355 indicating the residual IDC interference (e.g., desense) if the residual IDC interference for the first RAT, the second RAT, or both, satisfies (e.g., is greater or equal to than) one or more interference thresholds. In this regard, the UE 315 may indicate a residual interference level (e.g., desense level) for the non-affected bandwidth region which was originally indicated via the control message at 335.

Additionally, or alternatively, the control message may indicate preferred frequency resources (e.g., non-affecting frequency resources, non-affected frequency resources) and/or non-preferred frequency resources (e.g., affecting frequency resources, affected frequency resources) of the first RAT. In this regard, the UE 315 may be configured to update preferred/non-preferred frequency resources for the first RAT if the residual IDC interference is greater than or equal to the one or more interference thresholds. The UE 315 may update preferred/non-preferred frequency resources via BWP identifiers (e.g., BWP IDs), identifiers of resource block regions (e.g., PRB regions, PRB RIVs), resource bitmaps, LCIDs (e.g., eLCIDs), or any combination thereof.

The control message at 355 may include additional information (e.g., UEAssistanceInformation) associated with estimated IDC interference, including an a list of affected frequency carriers (e.g., AffectedCarrierFreqList), ARFCN indicators (e.g., ARFCN-ValueNR), indications of a direction of the predicted IDC interference (e.g., interferenceDirection), and the like. Moreover, the control message may indicate a residual interference level (e.g., desenseLevel). In cases where the second RAT includes a second 5G component carrier, the control message at 355 may also include ARFCN indicators (e.g., ARFCN-ValueNR) or cell index of the second 5G component carrier.

At 360, the UE 315 may receive control signaling from the base station 305 based on (e.g., in response to) the control message at 355. In some implementations, the base station 305 may transmit the control signaling in order to adjust one or more parameters (e.g., frequency resource, transmit power) associated with the first RAT in an attempt to reduce or eliminate residual IDC interference at the UE 315. Specifically, the control signaling may include a DCI message including FDRA information which indicates frequency resources which are to be used for subsequent communications over the first RAT.

For example, in cases where the UE 315 indicates affected frequency resources of the first RAT (e.g., frequency resources which suffer IDC interference), affecting frequency resources of the first RAT (e.g., frequency resources which cause IDC interference), or both, via the control message at 350, the control signaling may indicate a different frequency resource which is to be used for communications using the first RAT. In other words, the base station 305 may remove the affected and/or affecting frequency resource from a set of resources used for communications using the first RAT in order to reduce or eliminate estimated/predicted IDC interference. In some aspects, the control signaling may adjust a frequency resource used for communications using the first RAT (e.g., reduce the active downlink and/or uplink BWP of the UE 315) by instructing the UE 315 to switch from a first BWP to a second BWP, or via DCI FDRA, starting from some slot or other time period after the base station 305 acknowledges the control message. For instance, if the control message indicates a first frequency resource of the first RAT which is affected by IDC interference, the control signaling may indicate for the UE 315 to switch from a first BWP including the first frequency resource to a second BWP including a second frequency resource which is not affected by IDC interference.

Conversely, in cases where the UE 315 indicates non-affected frequency resources of the first RAT (e.g., frequency resources which do not suffer IDC interference), non-affecting frequency resources of the first RAT (e.g., frequency resources which do not cause IDC interference), or both, the control signaling may indicate a for the UE 315 to use the non-affecting and/or non-affected frequency resource for communications over the first RAT. In other words, the control signaling may indicate that subsequent communications using the first RAT will be performed using the non-affecting and/or non-affected frequency resource(s).

Additionally, or alternatively, the base station 305 may selectively adjust one or more other parameters of the first RAT (e.g., modulation and coding scheme (MCS)) via the control signaling at 360 in response to the control message at 355. For example, the control signaling may indicate an MCS usable for communications during subsequent time intervals (e.g., third time interval) between the UE 315 and the base station 305. In other words, the base station 305 may compensate the assigned downlink MCS level based on (e.g., by considering) the residual IDC interference experienced at the UE 315 during the second time interval.

At 365 the UE 315 may communicate with the base station 305 and the wireless device 310 during a third time interval which is subsequent to the second time interval. In other words, the communications at 345 may be performed subsequent to the communications during the second time interval at 345. Specifically, the UE 315 may communicate with the base station 305 and the wireless device 310 using the first RAT and the second RAT, respectively. In some aspects, the UE 315 may perform the wireless communications at 365 based on the control message at 355, the control signaling at 345, or both.

In some aspects, the UE 315 may communicate with the base station 305 and the wireless device 310 based on (e.g., using, in accordance with) frequency resources and/or transmit powers for the respective RATs which were indicated via the control signaling at 340. For example, in cases where the control signaling indicates a new frequency resource which is to be used for wireless communications over the first RAT (e.g., indicates for the UE 315 to switch BWPs), the UE 315 may communicate with the base station 305 within the indicated frequency resource. Similarly, in cases where the control signaling indicates a transmit power (e.g., uplink transmit power) for communications over the first RAT, the UE 315 may communicate with the base station 305 using the first RAT and the indicated transmit power.

Techniques described herein may provide for improved techniques for estimating and addressing IDC interference at the UE 315. Specifically, techniques described herein may enable the UE 315 to predict IDC interference which is expected to be experienced at the UE 315 before the UE 315 actually experiences the predicted IDC interference. In this regard, techniques described herein may enable the UE 315 to report preferred or non-preferred frequency resources and/or maximum transmit powers so that wireless communications at the UE 315 may be adjusted to prevent the anticipated IDC interference from occurring. By reducing a severity of IDC interference, or preventing IDC interference from occurring, techniques described herein may improve throughput at the UE 315 and improve resource utilization within the wireless communications system.

Figure 4:
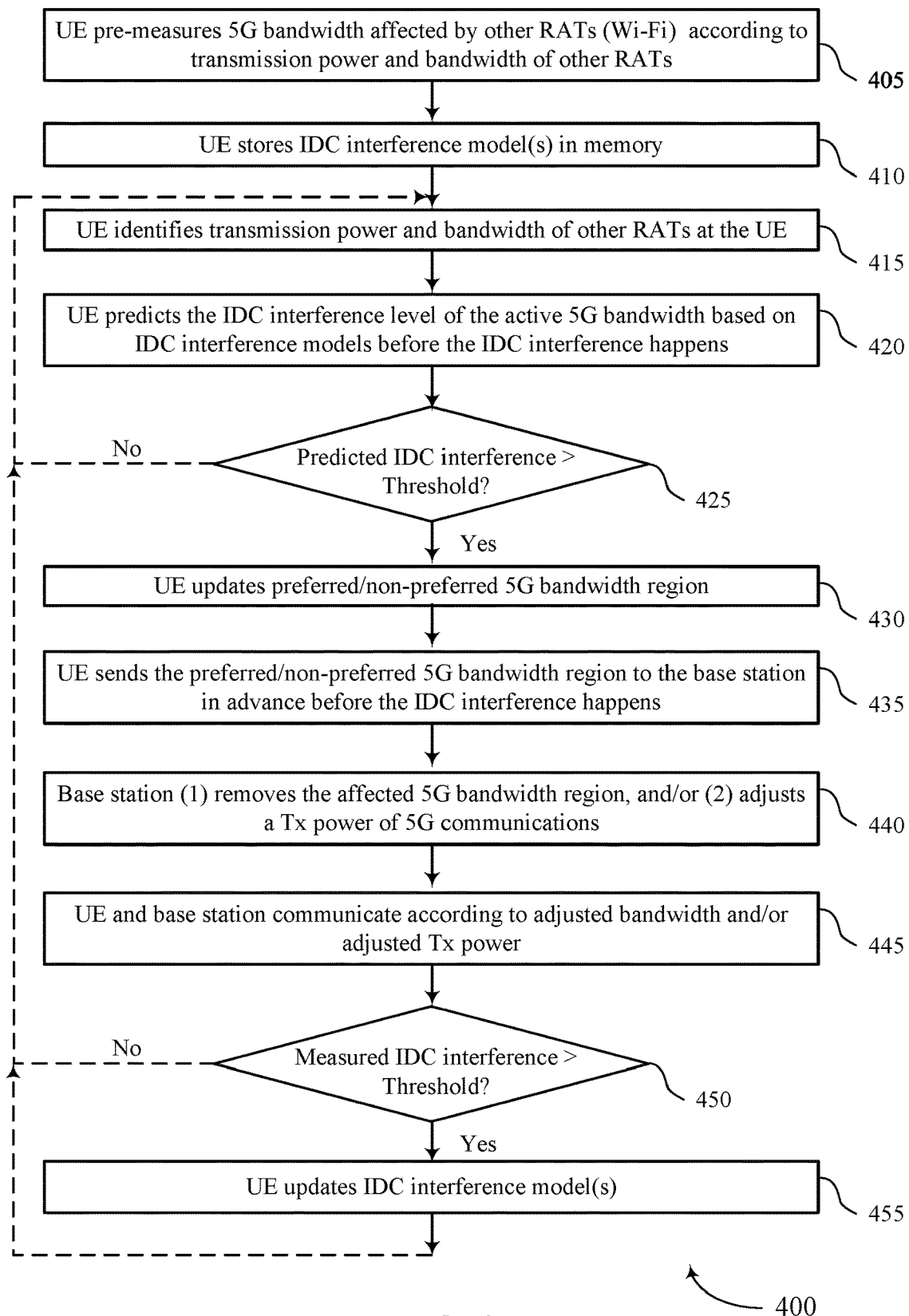
FIG. 4 illustrates an example of a flowchart that supports techniques for IDC interference in accordance with various aspects of the present disclosure.

FIG. 4 illustrates an example of a flowchart 400 that supports techniques for IDC interference in accordance with various aspects of the present disclosure. In some examples, flowchart 400 may implement, or be implemented by, aspects of wireless communications system 100, wireless communications system 200, process flow 300, or any combination thereof.

In some implementations, aspects of the flowchart 400 illustrated in FIG. 4 may be performed by a UE 115, a base station 105, or both. Specifically, the flowchart 400 illustrates communications between a UE 115 and a base station 105 which may be used to reduce, or eliminate, IDC interference which affects 5G communications at the UE 115 (e.g., 5G victim).

In some examples, the operations illustrated in flowchart 400 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At 405, the UE 115 may be configured to pre-measure a 5G bandwidth which is affected by other systems and/or other RATs (e.g., Wi-Fi) at the UE 115. The UE 115 may pre-measure the affected 5G bandwidth(s) based on a transmission power and/or bandwidth of the other systems and/or other RATs at the UE 115. Additionally, or alternatively, the UE 115 may pre-measure the affected 5G bandwidths based on a transmission power and bandwidth(s) of the 5G communications.

At 410, the UE 115 may store one or more IDC interference models in memory (e.g., non-volatile memory). The IDC interference models may include any model, table, or other data object known in the art which may be used to estimate/predict IDC interference at the UE 115. In some aspects, the UE 115 may generate and store the one or more IDC interference models based on pre-measuring the IDC interference at 405. In some implementations, the steps/operations performed at 405 and 410 may be performed prior to UE activation.

At 415, the UE may identify a transmission power and bandwidth of other systems and/or other RATs (e.g., Wi-Fi) at the UE 115. In other words, the UE 115 may access the current transmission power and bandwidth of other communications systems within the UE 115.

At 420, the UE may predict the IDC interference level of the active 5G bandwidth. The UE 115 may be configured to predict the IDC interference for 5G communications in advance (e.g., before the UE 115 experiences the IDC interference). The UE may predict the IDC interference level of the active 5G bandwidth based on the transmission power and bandwidth of other systems/RATs which was determined at 415 and by using the one or more IDC interference models which were generated/stored at 410.

At 425, the UE 115 may compare the predicted IDC interference determined at 420 to one or more interference thresholds. If the predicted IDC interference is less than or equal to the one or more interference thresholds (e.g., step 425="NO"), the flowchart may return to step 415. Conversely, if the predicted IDC interference is greater than the one or more interference thresholds (e.g., step 425="YES"), the flowchart may proceed to step 430.

At 430, the UE may update the preferred (e.g., non-affected) and/or non-preferred (e.g., affected) bandwidth regions of the 5G communications at the UE 115. In other words, the UE 115 may update a table or some other data structure which indicates which 5G bandwidth regions are or are not affected by other systems and/or other RATs (e.g., Wi-Fi) at the UE 115. In some cases, the UE 115 may be configured to consider potential band mitigation, band reduction, and/or transmit power reductions of the other systems/RATs when updating the preferred/non-preferred 5G bandwidth regions.

At 435, the UE 115 may send the preferred/non-preferred 5G bandwidth region(s) to the base station 105. In some cases, the UE 115 may transmit an indication of the preferred/non-preferred bandwidth regions to the base station 105 in advance (e.g., before the UE 115 experiences the predicted IDC interference). In some aspects, the UE 115 may indicate the preferred/non-preferred 5G bandwidth regions via RRC signaling (e.g., RRC IC) or other control signaling (e.g., UEAssistenceInformation message). Preferred/non-preferred bandwidth regions may be indicated via PRBs, BWP IDs, or both.

At 440, the base station 105 may be configured to address the predicted IDC interference at the UE 115 by removing the affected bandwidth regions(s) from 5G communications with the UE 115 and/or adjusting a transmit power of 5G communications between the UE 115 and the base station 105. In other words, the base station 105 may adjust a frequency over which the 5G communications between the UE 115 and the base station 105 are performed. Specifically, the base station 105 may adjust the frequency of the 5G communications to the preferred bandwidth region(s), and away from the non-preferred bandwidth regions which were indicated at 435. In some aspects, the base station 105 may transmit a control message indicating the modification to the 5G bandwidth regions and/or the modification to the 5G communication transmit power. For example, the base station 105 may transmit a control message (e.g., RRC message, DCI FDRA message) indicating PRBs and/or BWP IDs which are to be used for subsequent 5G communications.

At 445, the UE 115 and the base station 105 may communicate with one another using 5G and in accordance with the adjusted bandwidth regions and/or adjusted transmit power. In this regard, the UE 115 and the base station 105 may communicate in accordance with the adjusted 5G bandwidth regions, the adjusted 5G transmit power, or both. Additionally, the UE 115 may communicate with another wireless device using the other systems and/or other RATs at the UE 115.

At 450, the UE 115 may compare a measured IDC interference experienced at the UE 115 during the communications performed at 445 to one or more interference thresholds. In other words, the UE 115 may measure IDC interference for 5G communications which is attributable to other systems/RATs while communicating at 445, and may compare the measured IDC interference to one or more thresholds. If the measured IDC interference is less than or equal to the one or more interference thresholds (e.g., step 450="NO"), the flowchart may return to step 415. Conversely, if the measured IDC interference is greater than the one or more interference thresholds (e.g., step 450="YES"), the flowchart may proceed to step 455.

At 455, the UE 115 may update the one or more IDC interference models. Specifically, the UE 115 may update the one or more IDC interference models based on determining that the measured IDC interference is greater than the one or more interference thresholds at 450. In this regard, the UE 115 may update the IDC interference models in order to improve an accuracy of the IDC interference models in predicting IDC interference.

Figure 5:
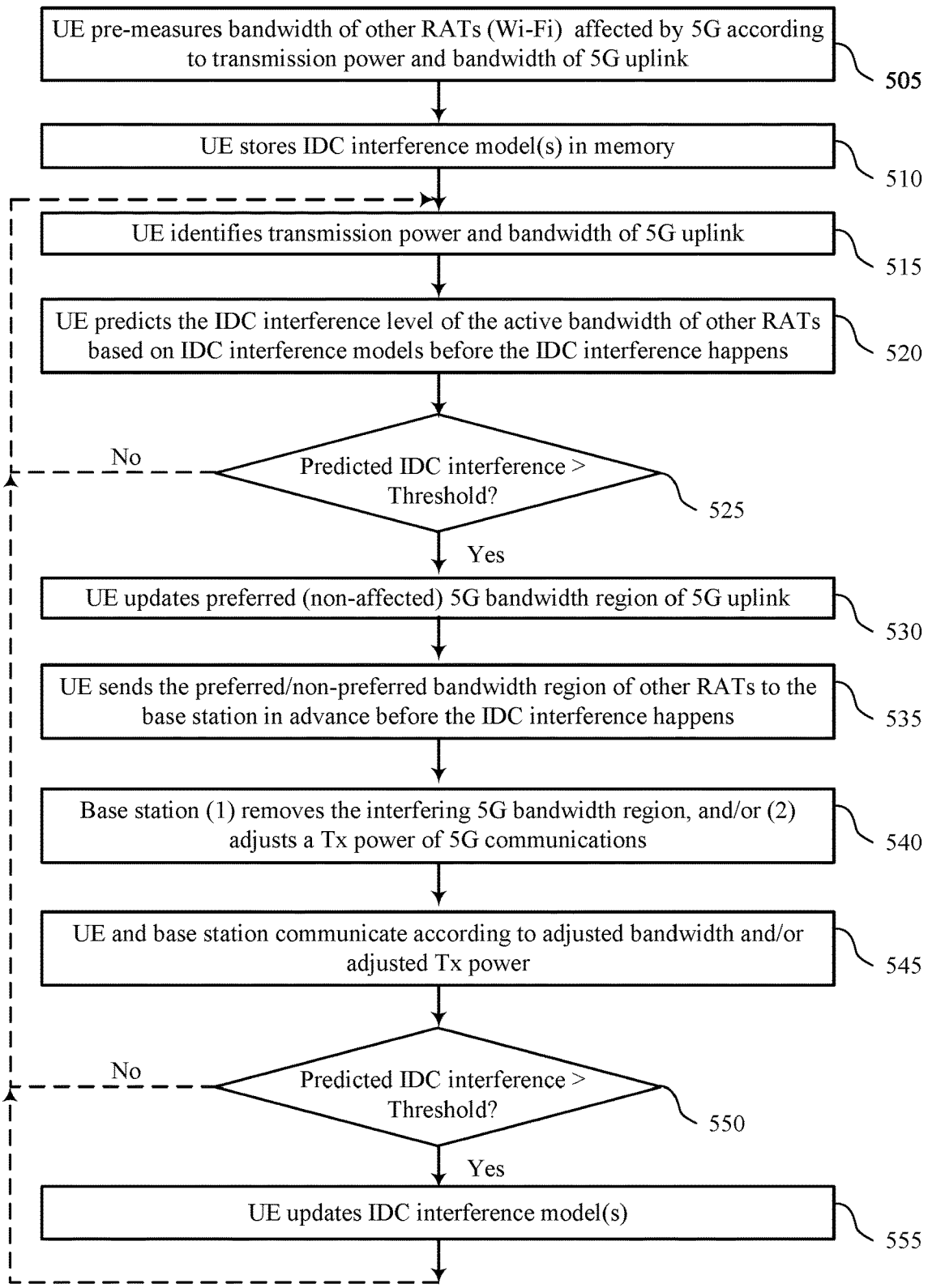
FIG. 5 illustrates an example of a flowchart that supports techniques for IDC interference in accordance with various aspects of the present disclosure.

FIG. 5 illustrates an example of a flowchart 500 that supports techniques for IDC interference in accordance with various aspects of the present disclosure. In some examples, flowchart 500 may implement, or be implemented by, aspects of wireless communications system 100, wireless communications system 200, process flow 300, flowchart 400, or any combination thereof.

In some implementations, aspects of the flowchart 500 illustrated in FIG. 5 may be performed by a UE 115, a base station 105, or both. Specifically, the flowchart 500 illustrates communications between a UE 115 and a base station 105 which may be used to reduce, or eliminate, IDC interference which is caused by 5G communications at the UE 115 (e.g., 5G aggressor).

In some examples, the operations illustrated in flowchart 500 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At 505, the UE 115 may be configured to pre-measure a bandwidth of other systems and/or other RATs (e.g., Wi-Fi) at the UE 115. The UE 115 may pre-measure the affected bandwidth(s) of other systems/RATs based on a transmission power and/or bandwidth of 5G communications (e.g., 5G uplink) at the UE 115. Additionally, or alternatively, the UE 115 may pre-measure the affected bandwidths based on a transmission power and bandwidth(s) of the other systems/RATs at the UE 115.

At 510, the UE 115 may store one or more IDC interference models in memory (e.g., non-volatile memory). The IDC interference models may include any model, table, or other data object known in the art which may be used to estimate/predict IDC interference at the UE 115. In some aspects, the UE 115 may generate and store the one or more IDC interference models based on pre-measuring the IDC interference at 505. In some implementations, the steps/operations performed at 505 and 510 may be performed prior to UE activation.

At 515, the UE may identify a transmission power and bandwidth of 5G communications (e.g., 5G uplink) at the UE 115. In other words, the UE 115 may access the current transmission power and bandwidth of 5G communications at the UE 115.

At 520, the UE 115 may predict the IDC interference level of the active bandwidth of the other systems and/or other RATs (e.g., Wi-Fi) at the UE 115. The UE 115 may be configured to predict the IDC interference for other systems/RATs in advance (e.g., before the UE 115 experiences the IDC interference). The UE may predict the IDC interference level of the active bandwidth of other systems/RATs based on the transmission power and bandwidth of 5G communications determined at 515, and by using the one or more IDC interference models which were generated/stored at 510.

At 525, the UE 115 may compare the predicted IDC interference determined at 520 to one or more interference thresholds. If the predicted IDC interference is less than or equal to the one or more interference thresholds (e.g., step 525="NO"), the flowchart 500 may return to step 515. Conversely, if the predicted IDC interference is greater than the one or more interference thresholds (e.g., step 525="YES"), the flowchart 500 may proceed to step 530.

At 530, the UE may update the preferred (e.g., non-affecting) and/or non-preferred (e.g., affecting) bandwidth regions of the 5G communications at the UE 115. In other words, the UE 115 may update a table or some other data structure which indicates which 5G bandwidth regions do or do not affect other systems and/or other RATs (e.g., Wi-Fi) at the UE 115. In some cases, the UE 115 may be configured to consider potential band mitigation, band reduction, and/or transmit power reductions of the other systems/RATs when updating the preferred/non-preferred 5G bandwidth regions.

At 535, the UE 115 may send the preferred/non-preferred 5G bandwidth region(s) to the base station 105. In other words, the UE 115 may indicate, to the base station 105, which 5G bandwidth regions do or do not cause IDC interference for other RATs. In some cases, the UE 115 may transmit an indication of the preferred/non-preferred bandwidth regions to the base station 105 in advance (e.g., before the UE 115 experiences the predicted IDC interference). In some aspects, the UE 115 may indicate the preferred/non-preferred 5G bandwidth regions via RRC signaling (e.g., RRC IC) or other control signaling (e.g., UEAssistenceInformation message). Preferred/non-preferred bandwidth regions may be indicated via PRBs, BWP IDs, or both. Additionally, or alternatively, the UE 115 may indicate, to the base station 105, a preferred maximum transmission power for 5G communications which may help reduce IDC interference for other RATs at the UE 115.

At 540, the base station 105 may be configured to address the predicted IDC interference at the UE 115 by removing the affecting bandwidth regions(s) from 5G communications with the UE 115 and/or adjusting a transmit power of 5G communications between the UE 115 and the base station 105. In other words, the base station 105 may adjust a frequency over which the 5G communications between the UE 115 and the base station 105 are performed. Specifically, the base station 105 may adjust the frequency of the 5G communications to the preferred (e.g., non-affecting) bandwidth region(s), and away from the non-preferred (e.g., affecting) bandwidth regions which were indicated at 535. In some aspects, the base station 105 may transmit a control message indicating the modification to the 5G bandwidth regions and/or the modification to the 5G communication transmit power. For example, the base station 105 may transmit a control message (e.g., RRC message, DCI FDRA message) indicating PRBs and/or BWP IDs which are to be used for subsequent 5G communications.

At 545, the UE 115 and the base station 105 may communicate with one another using 5G and in accordance with the adjusted bandwidth regions and/or adjusted transmit power. In this regard, the UE 115 and the base station 105 may communicate in accordance with the adjusted 5G bandwidth regions, the adjusted 5G transmit power, or both. Additionally, the UE 115 may communicate with another wireless device using the other systems and/or other RATs at the UE 115.

At 550, the UE 115 may compare a measured IDC interference experienced at the UE 115 during the communications performed at 545 to one or more interference thresholds. In other words, the UE 115 may measure IDC interference for other systems/RATs which is attributable to 5G communications while communicating at 545, and may compare the measured IDC interference to one or more thresholds. If the measured IDC interference is less than or equal to the one or more interference thresholds (e.g., step 550="NO"), the flowchart 500 may return to step 515.

Conversely, if the measured IDC interference is greater than the one or more interference thresholds (e.g., step 550="YES"), the flowchart 500 may proceed to step 555.

At 555, the UE 115 may update the one or more IDC interference models. Specifically, the UE 115 may update the one or more IDC interference models based on determining that the measured IDC interference is greater than the one or more interference thresholds at 550. In this regard, the UE 115 may update the IDC interference models in order to improve an accuracy of the IDC interference models in predicting IDC interference.

Figure 6:
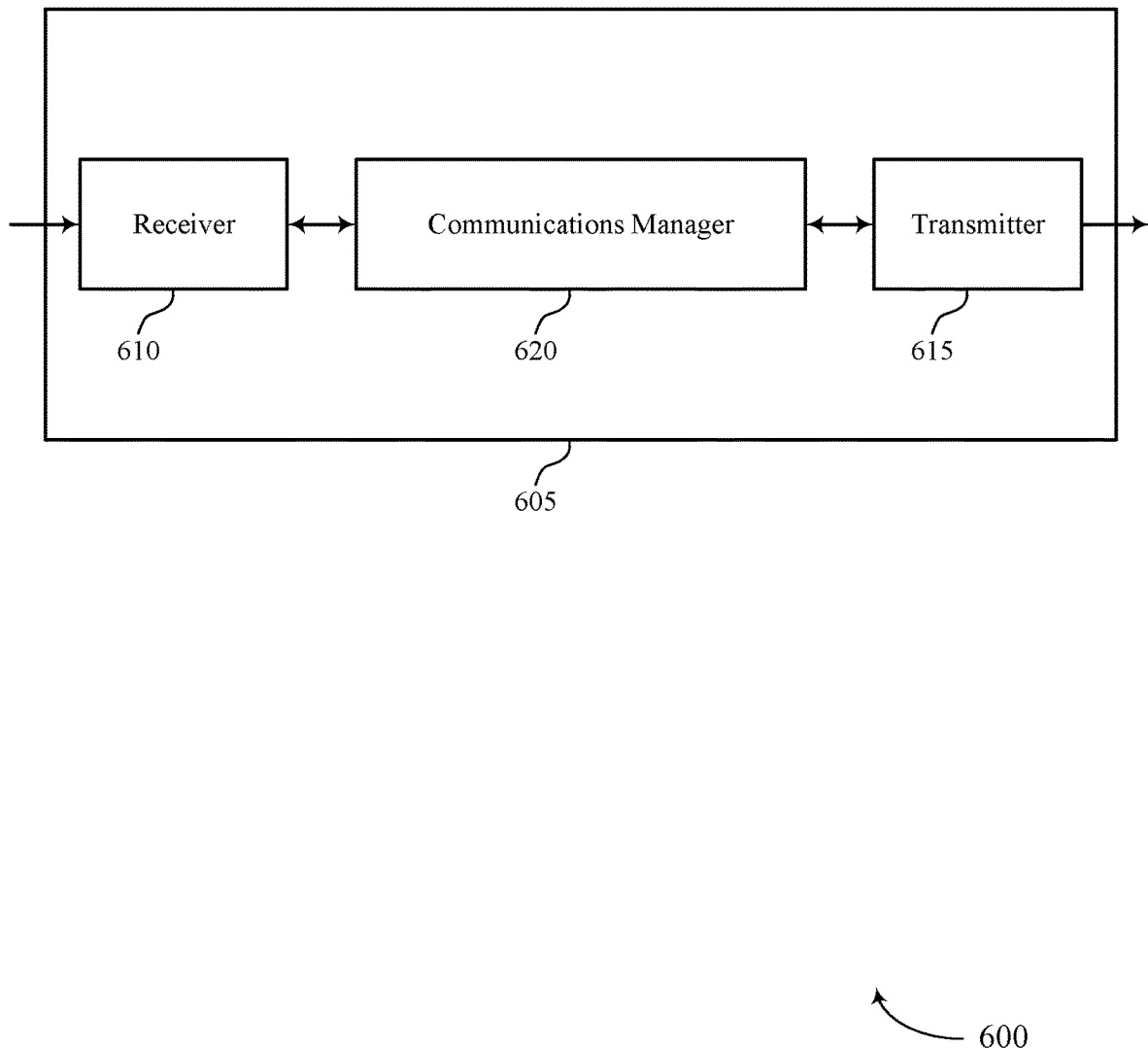
FIGS. 6 and 7 show block diagrams of devices that support techniques for IDC interference in accordance with various aspects of the present disclosure.

FIG. 6 shows a block diagram 600 of a device 605 that supports techniques for IDC interference in accordance with various aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for IDC interference). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for IDC interference). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of techniques for IDC interference as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. For example, the communications manager 620 may be configured as or otherwise support a means for estimating, during a first time interval, at least one of a first interference level for a first RAT caused at least in part by a second RAT, a second interference level for the second RAT caused at least in part by the first RAT, or a combination thereof. The communications manager 620 may be configured as or otherwise support a means for transmitting a control message to a base station using the first RAT based on at least one of the first estimated interference level, the second estimated interference level, or a combination thereof. The communications manager 620 may be configured as or otherwise support a means for communicating, based on the control message, with the base station using the first RAT during a second time interval, the second time interval being after the first time interval. The communications manager 620 may be configured as or otherwise support a means for communicating, based on the control message, with a wireless device using the second RAT during the second time interval.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for estimating and addressing IDC interference at a UE 115. Specifically, techniques described herein may enable a UE 115 to predict IDC interference which is expected to be experienced at the UE 115 before the UE 115 actually experiences the predicted IDC interference. In this regard, techniques described herein may enable the UE 115 to report preferred or non-preferred frequency resources and/or maximum transmit powers so that wireless communications at the UE 115 may be adjusted to prevent the anticipated IDC interference from occurring. By reducing a severity of IDC interference, or preventing IDC interference from occurring, techniques described herein may improve throughput at the UE 115 and improve resource utilization within the wireless communications system.

Figure 7:
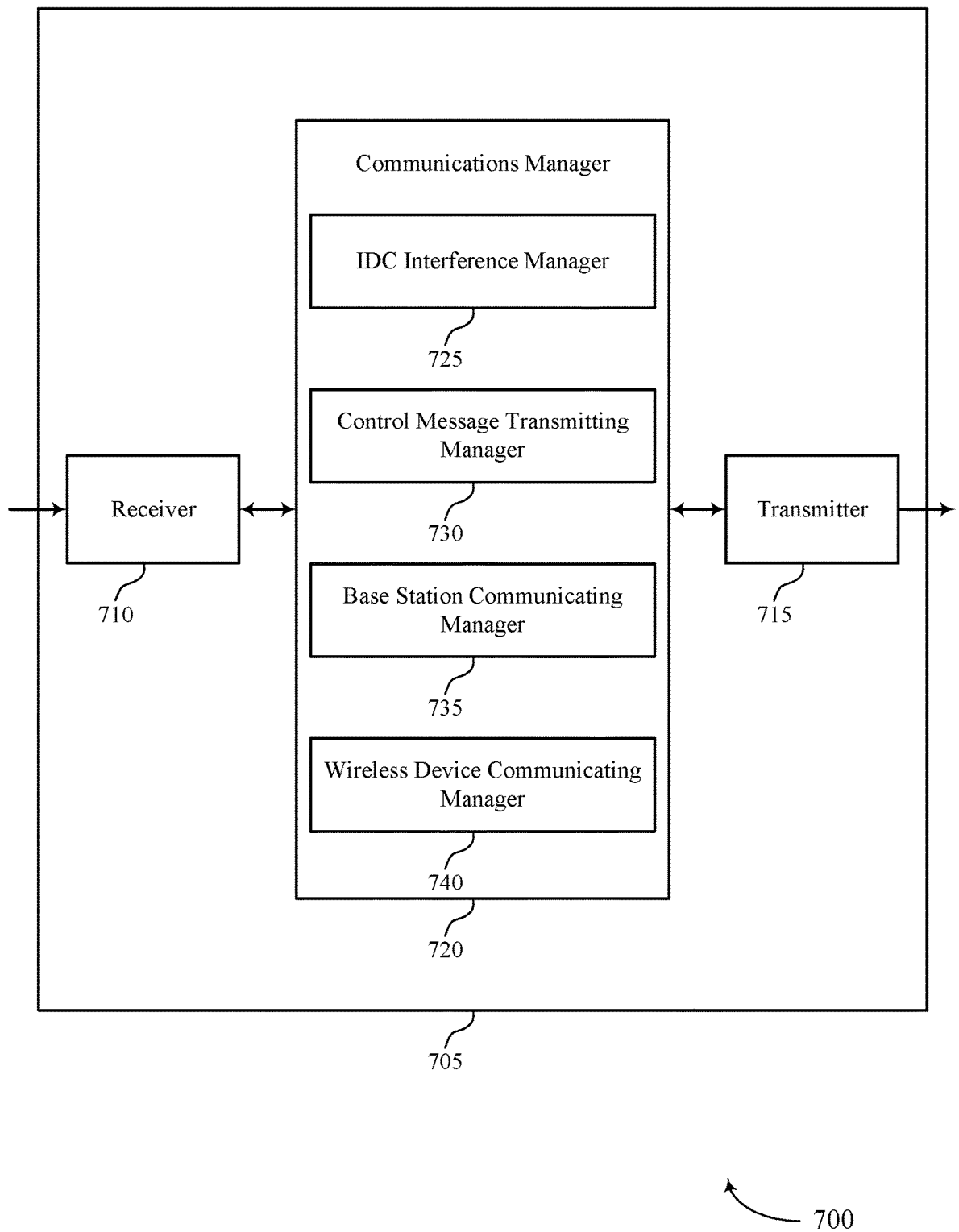

FIG. 7 shows a block diagram 700 of a device 705 that supports techniques for IDC interference in accordance with various aspects of the present disclosure. The device 705 may be an example of aspects of a device 605 or a UE 115 as described herein. The device 705 may include a receiver 710, a transmitter 715, and a communications manager 720.

The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for IDC interference). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for IDC interference). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of techniques for IDC interference as described herein. For example, the communications manager 720 may include an IDC interference manager 725, a control message transmitting manager 730, a base station communicating manager 735, a wireless device communicating manager 740, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a UE in accordance with examples as disclosed herein. The IDC interference manager 725 may be configured as or otherwise support a means for estimating, during a first time interval, at least one of a first interference level for a first RAT caused at least in part by a second RAT, a second interference level for the second RAT caused at least in part by the first RAT, or a combination thereof. The control message transmitting manager 730 may be configured as or otherwise support a means for transmitting a control message to a base station using the first RAT based on at least one of the first estimated interference level, the second estimated interference level, or a combination thereof. The base station communicating manager 735 may be configured as or otherwise support a means for communicating, based on the control message, with the base station using the first RAT during a second time interval, the second time interval being after the first time interval. The wireless device communicating manager 740 may be configured as or otherwise support a means for communicating, based on the control message, with a wireless device using the second RAT during the second time interval.

Figure 8:
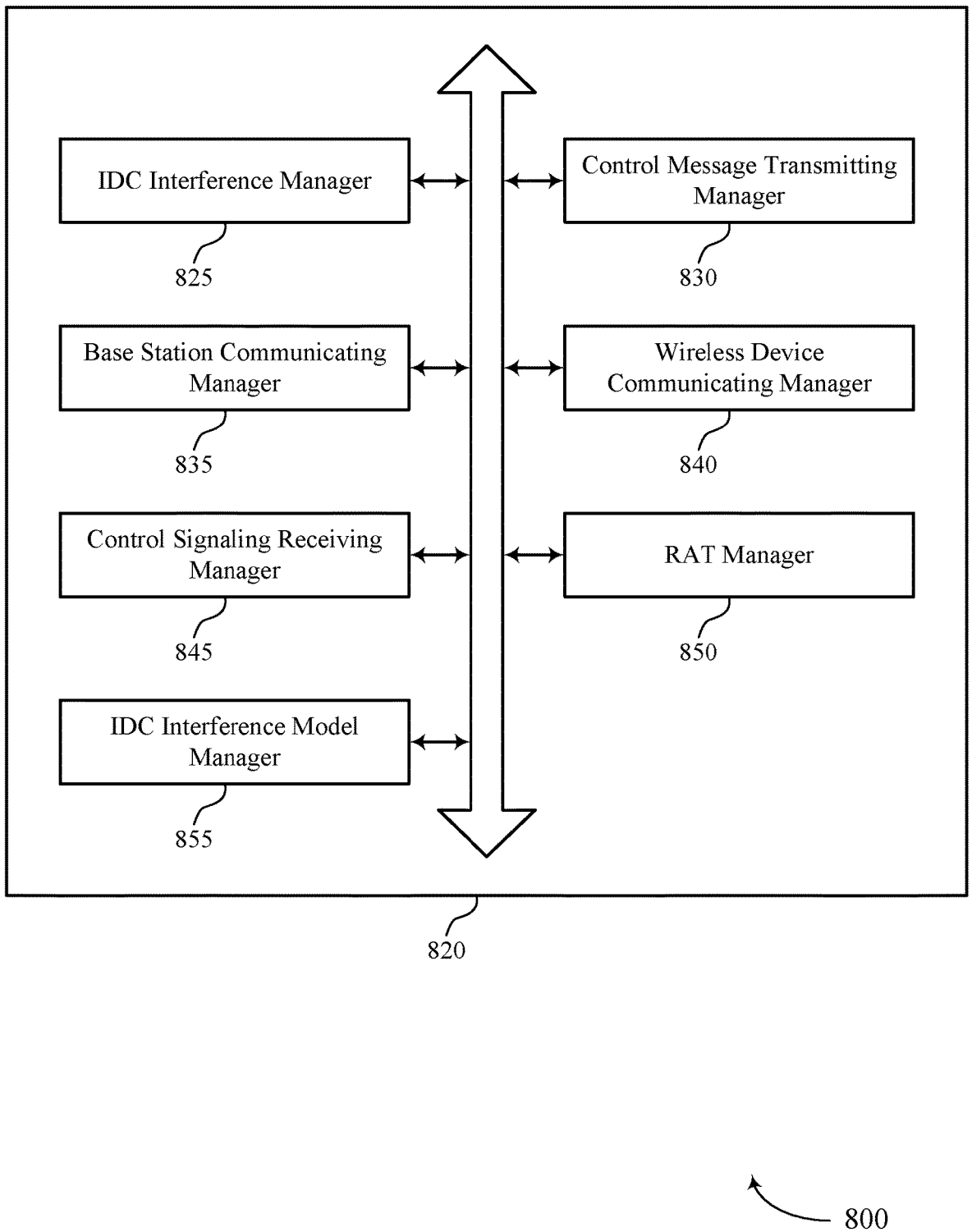
FIG. 8 shows a block diagram of a communications manager that supports techniques for IDC interference in accordance with various aspects of the present disclosure.

FIG. 8 shows a block diagram 800 of a communications manager 820 that supports techniques for IDC interference in accordance with various aspects of the present disclosure. The communications manager 820 may be an example of aspects of a communications manager 620, a communications manager 720, or both, as described herein. The communications manager 820, or various components thereof, may be an example of means for performing various aspects of techniques for IDC interference as described herein. For example, the communications manager 820 may include an IDC interference manager 825, a control message transmitting manager 830, a base station communicating manager 835, a wireless device communicating manager 840, a control signaling receiving manager 845, a RAT manager 850, an IDC interference model manager 855, or any combination thereof. Each of these components may communicate, directly or indirectly, with one another (e.g., via one or more buses).

The communications manager 820 may support wireless communication at a UE in accordance with examples as disclosed herein. The IDC interference manager 825 may be configured as or otherwise support a means for estimating, during a first time interval, at least one of a first interference level for a first RAT caused at least in part by a second RAT, a second interference level for the second RAT caused at least in part by the first RAT, or a combination thereof. The control message transmitting manager 830 may be configured as or otherwise support a means for transmitting a control message to a base station using the first RAT based on at least one of the first estimated interference level, the second estimated interference level, or a combination thereof. The base station communicating manager 835 may be configured as or otherwise support a means for communicating, based on the control message, with the base station using the first RAT during a second time interval, the second time interval being after the first time interval. The wireless device communicating manager 840 may be configured as or otherwise support a means for communicating, based on the control message, with a wireless device using the second RAT during the second time interval.

In some examples, the control message transmitting manager 830 may be configured as or otherwise support a means for transmitting, via the control message, an indication of a first frequency resource determined based on the first estimated interference level, the second estimated interference level, or both, where the first frequency resource includes an affected frequency resource of the first RAT which is affected by the transmission of communications at the UE via the second RAT, or a non-affected frequency resource of the first RAT which is not affected by the transmission of communications at the UE via the second RAT. In some examples, the control signaling receiving manager 845 may be configured as or otherwise support a means for receiving, from the base station based on the indication of the first frequency resource, control signaling indicating a second frequency resource, the second frequency resource including the first frequency resource or a different frequency resource, where communications with the base station during the second time interval are performed based on the second frequency resource.

In some examples, the indication of the first frequency resource includes a BWP identifier, a identifier of a resource block region, or a combination thereof.

In some examples, the control signaling includes an indication for the UE to switch from a first BWP to a second BWP including the second frequency resource. In some examples, the control signaling includes a DCI message including a FDRA associated with the second frequency resource.

In some examples, the control message transmitting manager 830 may be configured as or otherwise support a means for transmitting, via the control message, an indication of a first frequency resource determined based on the first estimated interference level, the second estimated interference level, or both, where the first frequency resource includes an affecting frequency resource of the first RAT which affects the reception of communications at the UE via the second RAT, or a non-affecting frequency resource of the first RAT which does not affect the reception of communications at the UE via the second RAT. In some examples, the control signaling receiving manager 845 may be configured as or otherwise support a means for receiving, from the base station based on the indication of the first frequency resource, control signaling indicating a second frequency resource, the second frequency resource including the first frequency resource or a different frequency resource, where communications with the base station during the second time interval are performed based on the second frequency resource.

In some examples, the control signaling receiving manager 845 may be configured as or otherwise support a means for receiving, from the base station based on the control message, control signaling indicating a frequency resource associated with the first RAT, where communications with the base station during the second time interval are performed based on the frequency resource. In some examples, the control message transmitting manager 830 may be configured as or otherwise support a means for transmitting, to the base station, a second control message including an indication of a residual interference level for the first RAT caused in part by the second RAT during at least a portion of the second time interval. In some examples, the control signaling receiving manager 845 may be configured as or otherwise support a means for receiving, from the base station in response to the indication of the residual interference level, additional control signaling indicating a modulation and coding scheme usable for communications between the UE and the base station during a third time interval subsequent to the third time interval.

In some examples, the IDC interference manager 825 may be configured as or otherwise support a means for estimating, during the second time interval, a third interference level for the first RAT caused in part by the second RAT, a fourth interference level for the second RAT caused in part by the first RAT, or a combination thereof. In some examples, the control message transmitting manager 830 may be configured as or otherwise support a means for transmitting, to the base station, a third control message indicating a frequency resource based on the third estimated interference level satisfying a first interference threshold, the fourth estimated interference level satisfying a second threshold interference threshold, or both.

In some examples, the control message transmitting manager 830 may be configured as or otherwise support a means for transmitting, via the control message, a request for the base station to modify a frequency resource associated with communications performed between the UE and the base station based on the first estimated interference level, the second estimated interference level, or both, where communicating with the base station during the second time interval is based on the request.

In some examples, to support estimating the first interference level, the RAT manager 850 may be configured as or otherwise support a means for identifying a first transmission power, a first frequency resource, or both, associated with communications performed using the second RAT. In some examples, to support estimating the first interference level, the RAT manager 850 may be configured as or otherwise support a means for identifying a second transmission power, a second frequency resource, or both, associated with communications performed using the second RAT. In some examples, to support estimating the first interference level, the IDC interference manager 825 may be configured as or otherwise support a means for estimating the first interference level, the second interference level, or both, based on the first transmission power, the first frequency resource, the second transmission power, the second frequency resource, or a combination thereof, and in accordance with one or more models for estimating IDC interference at the UE between communications associated with two or more radio access technologies.

In some examples, to support transmitting the control message, the control message transmitting manager 830 may be configured as or otherwise support a means for transmitting the control message based on the first estimated interference level satisfying a first interference threshold, the second estimated interference level satisfying a second interference threshold, or both.

In some examples, to support transmitting the control message, the control message transmitting manager 830 may be configured as or otherwise support a means for transmitting, via the control message, an indication of a maximum transmit power at the UE associated with communications performed via the first RAT. In some examples, to support transmitting the control message, the control signaling receiving manager 845 may be configured as or otherwise support a means for receiving, from the base station based on the indication of the maximum transmit power, a second control message indicating a transmit power for communications at the UE, where communications with the base station during the second time interval are performed based on the indicated transmit power.

In some examples, the control signaling receiving manager 845 may be configured as or otherwise support a means for receiving, from the base station, additional control signaling indicating a set of critical uplink resources associated with the first RAT, where communicating with the base station during the second time interval includes transmitting one or more uplink transmissions to the base station within the set of critical uplink resources. In some examples, the one or more uplink transmissions include an SRS, a CSI report, or both.

In some examples, the base station communicating manager 835 may be configured as or otherwise support a means for communicating with the base station using the first RAT and with the wireless device using the second RAT during a third time interval which is prior to the first time interval. In some examples, the IDC interference manager 825 may be configured as or otherwise support a means for estimating, during the third time interval, a third interference level for the first RAT caused in part by the second RAT, a fourth interference level for the second RAT caused in part by the first RAT, or a combination thereof. In some examples, the IDC interference model manager 855 may be configured as or otherwise support a means for generating one or more models for estimating IDC interference at the UE between communications associated with two or more radio access technologies, where the estimating during the second time interval is performed based on the one or more models.

In some examples, the control message includes an RRC message, a MAC-CE message, or both. In some examples, the first RAT includes an NR access technology, a 5G RAT, or both, and the second RAT includes a Wi-Fi RAT. In some examples, the first RAT includes a first 5G component carrier, and the second RAT includes a second 5G component carrier.

Figure 9:
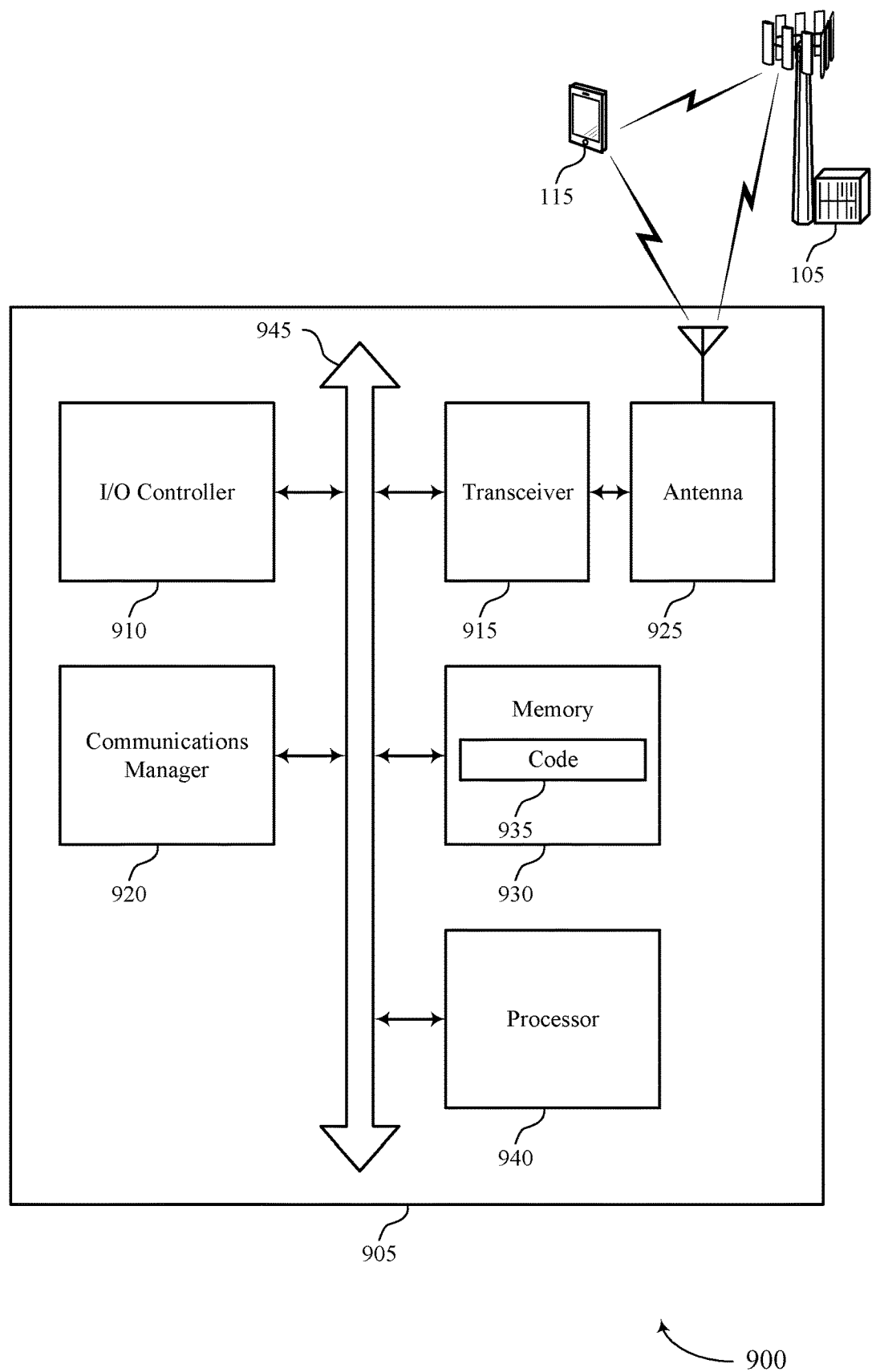
FIG. 9 shows a diagram of a system including a device that supports techniques for IDC interference in accordance with various aspects of the present disclosure.

FIG. 9 shows a diagram of a system 900 including a device 905 that supports techniques for IDC interference in accordance with various aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting techniques for IDC interference). For example, the device 905 or a component of the device 905 may include a processor 940 and memory 930 coupled to the processor 940, the processor 940 and memory 930 configured to perform various functions described herein.

The communications manager 920 may support wireless communication at a UE in accordance with examples as disclosed herein. For example, the communications manager 920 may be configured as or otherwise support a means for estimating, during a first time interval, at least one of a first interference level for a first RAT caused at least in part by a second RAT, a second interference level for the second RAT caused at least in part by the first RAT, or a combination thereof. The communications manager 920 may be configured as or otherwise support a means for transmitting a control message to a base station using the first RAT based on at least one of the first estimated interference level, the second estimated interference level, or a combination thereof. The communications manager 920 may be configured as or otherwise support a means for communicating, based on the control message, with the base station using the first RAT during a second time interval, the second time interval being after the first time interval. The communications manager 920 may be configured as or otherwise support a means for communicating, based on the control message, with a wireless device using the second RAT during the second time interval.

By including or configuring the communications manager 920 in accordance with examples as described herein, the device 905 may support techniques for estimating and addressing IDC interference at a UE 115. Specifically, techniques described herein may enable a UE 115 to predict IDC interference which is expected to be experienced at the UE 115 before the UE 115 actually experiences the predicted IDC interference. In this regard, techniques described herein may enable the UE 115 to report preferred or non-preferred frequency resources and/or maximum transmit powers so that wireless communications at the UE 115 may be adjusted to prevent the anticipated IDC interference from occurring. By reducing a severity of IDC interference, or preventing IDC interference from occurring, techniques described herein may improve throughput at the UE 115 and improve resource utilization within the wireless communications system.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of techniques for IDC interference as described herein, or the processor 940 and the memory 930 may be otherwise configured to perform or support such operations.

Figure 10:
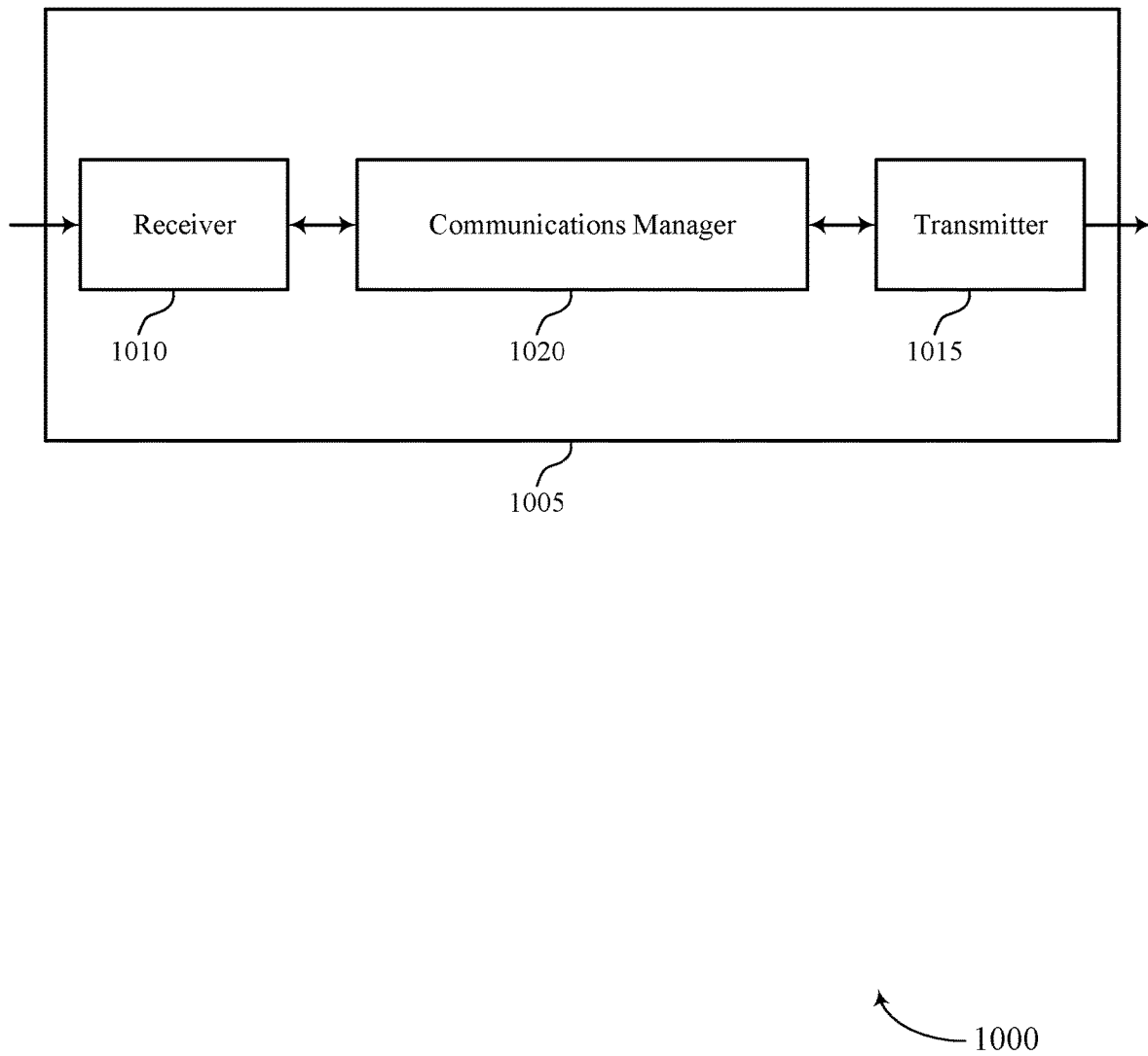
FIGS. 10 and 11 show block diagrams of devices that support techniques for IDC interference in accordance with various aspects of the present disclosure.

FIG. 10 shows a block diagram 1000 of a device 1005 that supports techniques for IDC interference in accordance with various aspects of the present disclosure. The device 1005 may be an example of aspects of a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to techniques for IDC interference). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to techniques for IDC interference). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of techniques for IDC interference as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a base station in accordance with examples as disclosed herein. For example, the communications manager 1020 may be configured as or otherwise support a means for receiving, from a UE using a first RAT and during a first time interval, a control message including an indication associated with a first estimated interference level at the UE for the first RAT caused at least in part by a second RAT, a second estimated interference level at the UE for the second RAT caused at least in part by the first RAT, or a combination thereof. The communications manager 1020 may be configured as or otherwise support a means for transmitting control signaling to the UE using the first RAT based on the first estimated interference level, the second estimated interference level, or a combination thereof. The communications manager 1020 may be configured as or otherwise support a means for communicating with the UE during a second time interval after the first time interval using the first RAT and based on transmitting the control signaling.

By including or configuring the communications manager 1020 in accordance with examples as described herein, the device 1005 (e.g., a processor controlling or otherwise coupled to the receiver 1010, the transmitter 1015, the communications manager 1020, or a combination thereof) may support techniques for estimating and addressing IDC interference at a UE 115. Specifically, techniques described herein may enable a UE 115 to predict IDC interference which is expected to be experienced at the UE 115 before the UE 115 actually experiences the predicted IDC interference. In this regard, techniques described herein may enable the UE 115 to report preferred or non-preferred frequency resources and/or maximum transmit powers so that wireless communications at the UE 115 may be adjusted to prevent the anticipated IDC interference from occurring. By reducing a severity of IDC interference, or preventing IDC interference from occurring, techniques described herein may improve throughput at the UE 115 and improve resource utilization within the wireless communications system.

Figure 11:
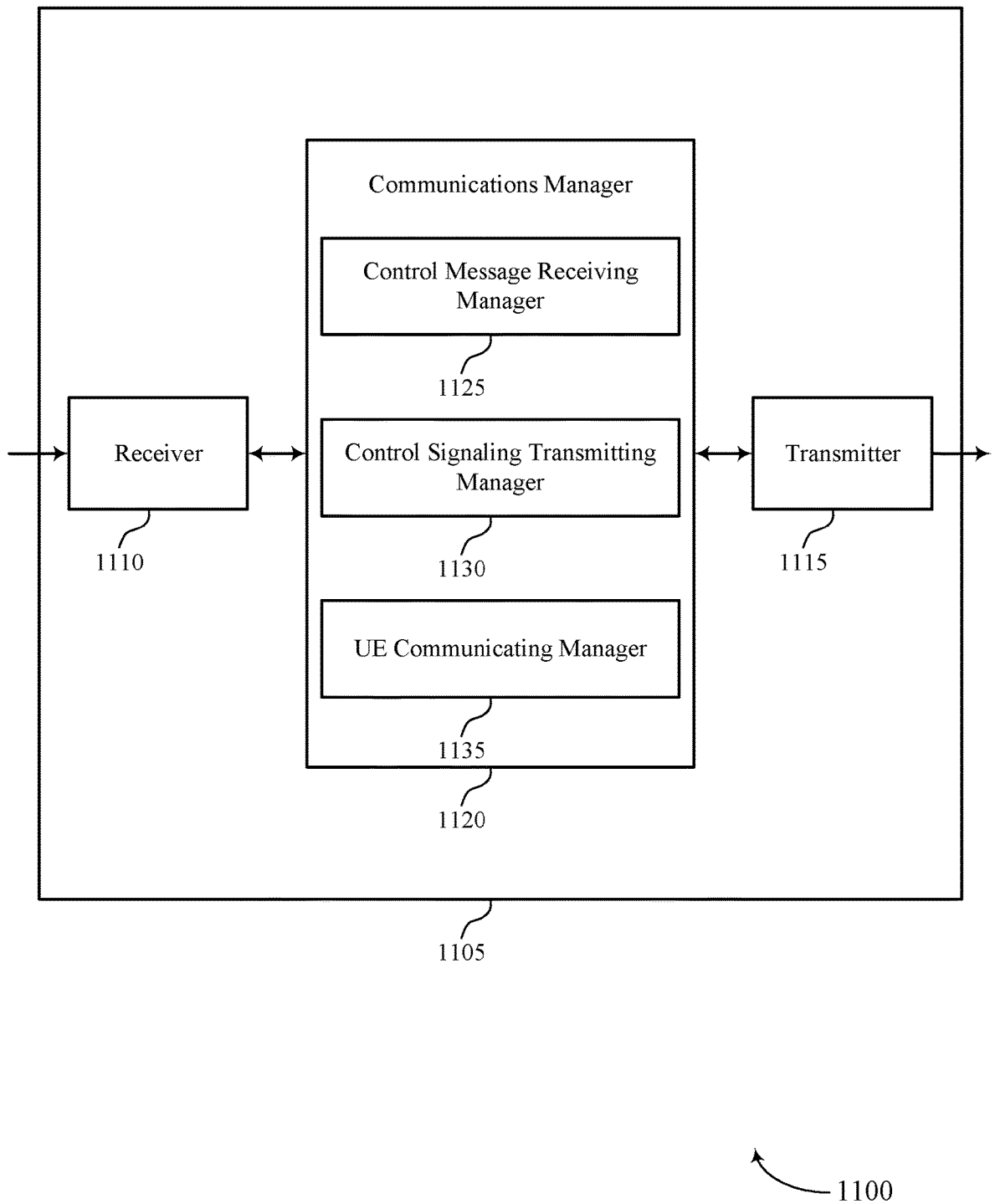

FIG. 11 shows a block diagram 1100 of a device 1105 that supports techniques for IDC interference in accordance with various aspects of the present disclosure. The device 1105 may be an example of aspects of a device 1005 or a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to techniques for IDC interference). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to techniques for IDC interference). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of techniques for IDC interference as described herein. For example, the communications manager 1120 may include a control message receiving manager 1125, a control signaling transmitting manager 1130, a UE communicating manager 1135, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a base station in accordance with examples as disclosed herein. The control message receiving manager 1125 may be configured as or otherwise support a means for receiving, from a UE using a first RAT and during a first time interval, a control message including an indication associated with a first estimated interference level at the UE for the first RAT caused at least in part by a second RAT, a second estimated interference level at the UE for the second RAT caused at least in part by the first RAT, or a combination thereof. The control signaling transmitting manager 1130 may be configured as or otherwise support a means for transmitting control signaling to the UE using the first RAT based on the first estimated interference level, the second estimated interference level, or a combination thereof. The UE communicating manager 1135 may be configured as or otherwise support a means for communicating with the UE during a second time interval after the first time interval using the first RAT and based on transmitting the control signaling.

Figure 12:
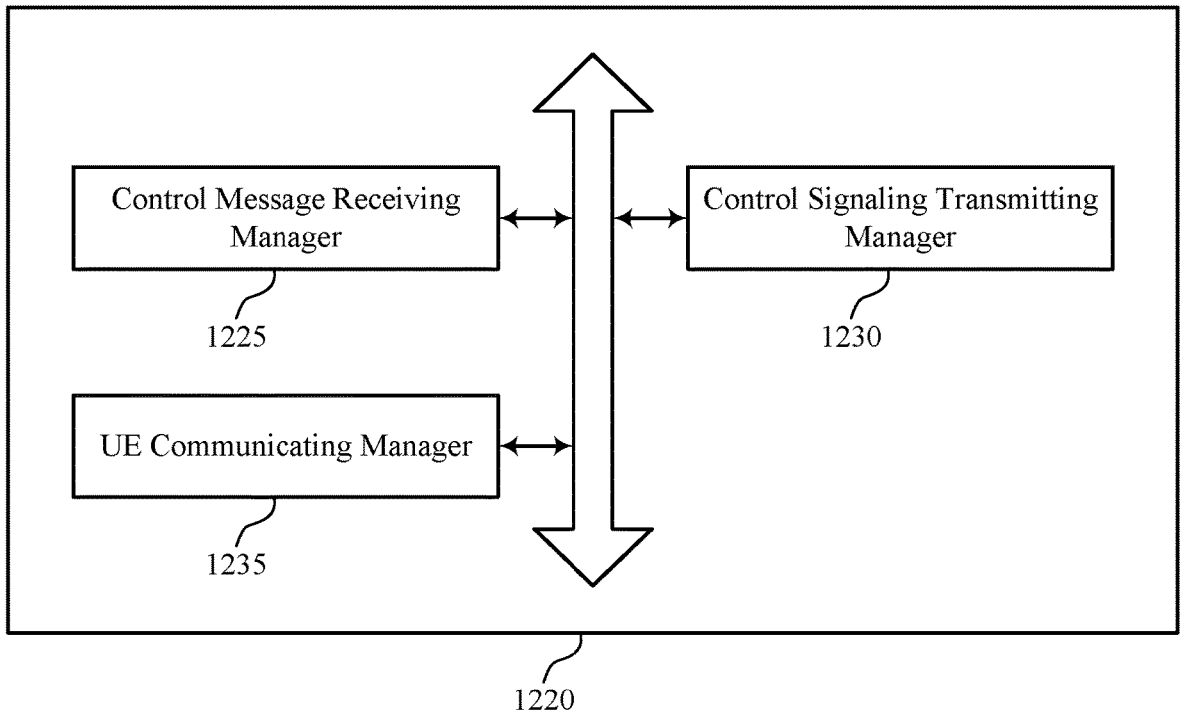
FIG. 12 shows a block diagram of a communications manager that supports techniques for IDC interference in accordance with various aspects of the present disclosure.

FIG. 12 shows a block diagram 1200 of a communications manager 1220 that supports techniques for IDC interference in accordance with various aspects of the present disclosure. The communications manager 1220 may be an example of aspects of a communications manager 1020, a communications manager 1120, or both, as described herein. The communications manager 1220, or various components thereof, may be an example of means for performing various aspects of techniques for IDC interference as described herein. For example, the communications manager 1220 may include a control message receiving manager 1225, a control signaling transmitting manager 1230, a UE communicating manager 1235, or any combination thereof. Each of these components may communicate, directly or indirectly, with one another (e.g., via one or more buses).

The communications manager 1220 may support wireless communication at a base station in accordance with examples as disclosed herein. The control message receiving manager 1225 may be configured as or otherwise support a means for receiving, from a UE using a first RAT and during a first time interval, a control message including an indication associated with a first estimated interference level at the UE for the first RAT caused at least in part by a second RAT, a second estimated interference level at the UE for the second RAT caused at least in part by the first RAT, or a combination thereof. The control signaling transmitting manager 1230 may be configured as or otherwise support a means for transmitting control signaling to the UE using the first RAT based on the first estimated interference level, the second estimated interference level, or a combination thereof. The UE communicating manager 1235 may be configured as or otherwise support a means for communicating with the UE during a second time interval after the first time interval using the first RAT and based on transmitting the control signaling.

In some examples, the control message receiving manager 1225 may be configured as or otherwise support a means for receiving, via the control message, an indication of a first frequency resource determined based on the first estimated interference level, the second estimated interference level, or both, where the first frequency resource includes an affected frequency resource of the first RAT which is affected by the transmission of communications at the UE via the second RAT, or a non-affected frequency resource of the first RAT which is not affected by the transmission of communications at the UE via the second RAT. In some examples, the control signaling transmitting manager 1230 may be configured as or otherwise support a means for transmitting, via the control signaling based on the indication of the first frequency resource, an indication of a second frequency resource, the second frequency resource including the first frequency resource or a different frequency resource, where communications with the UE during the second time interval are performed based on the second frequency resource.

In some examples, the indication of the first frequency resource includes a BWP identifier, a identifier of a resource block region, or a combination thereof.

In some examples, the control signaling includes an indication for the UE to switch from a first BWP to a second BWP including the second frequency resource. In some examples, the control signaling includes a DCI message including a FDRA associated with the second frequency resource.

In some examples, the control message receiving manager 1225 may be configured as or otherwise support a means for receiving, via the control message, an indication of a first frequency resource determined based on the first estimated interference level, the second estimated interference level, or both, where the first frequency resource includes an affecting frequency resource of the first RAT which affects the reception of communications at the UE via the second RAT, or a non-affecting frequency resource of the first RAT does not affect the reception of communications at the UE via the second RAT. In some examples, the control signaling transmitting manager 1230 may be configured as or otherwise support a means for transmitting, via the control signaling based on the indication of the first frequency resource, an indication of a second frequency resource, the second frequency resource including the first frequency resource or a different frequency resource, where communications with the UE during the second time interval are performed based on the second frequency resource.

In some examples, the control signaling transmitting manager 1230 may be configured as or otherwise support a means for transmitting, to the UE based on the control message, control signaling indicating a frequency resource associated with the first RAT, where communications with the UE during the second time interval are performed based on the frequency resource. In some examples, the control message receiving manager 1225 may be configured as or otherwise support a means for receiving, from the UE, a second control message including an indication of a residual interference level for the first RAT caused in part by the second RAT during at least a portion of the second time interval. In some examples, the control signaling transmitting manager 1230 may be configured as or otherwise support a means for transmitting, to the UE in response to the indication of the residual interference level, additional control signaling indicating a modulation and coding scheme usable for communications between the UE and the base station during a third time interval subsequent to the second time interval.

In some examples, the control message receiving manager 1225 may be configured as or otherwise support a means for receiving, from the UE, a third control message indicating a frequency resource based on a third estimated interference level at the UE for the first RAT caused in part by the second RAT satisfying a first interference threshold, a fourth estimated interference level at the UE for the second RAT caused in part by the first RAT satisfying a second threshold interference threshold, or a combination thereof.

In some examples, the control message receiving manager 1225 may be configured as or otherwise support a means for receiving, via the control message, a request for the base station to modify a frequency resource associated with communications performed between the UE and the base station based on the first estimated interference level, the second estimated interference level, or both, where communicating with the UE during the second time interval is based on the request.

In some examples, to support receiving the control message, the control message receiving manager 1225 may be configured as or otherwise support a means for receiving the control message based on the first estimated interference level satisfying a first interference threshold, the second estimated interference level satisfying a second interference threshold, or both.

In some examples, to support receiving the control message, the control message receiving manager 1225 may be configured as or otherwise support a means for receiving, via the control message, an indication of a maximum transmit power at the UE associated with communications performed via the first RAT. In some examples, to support receiving the control message, the control signaling transmitting manager 1230 may be configured as or otherwise support a means for transmitting, to the UE based on the indication of the maximum transmit power, a second control message indicating a transmit power for communications at the UE, where communications with the UE during the second time interval are performed based on the indicated transmit power.

In some examples, the control signaling transmitting manager 1230 may be configured as or otherwise support a means for transmitting, to the UE, additional control signaling indicating a set of critical uplink resources associated with the first RAT, where communicating with the UE during the second time interval includes receiving one or more uplink transmissions from the UE within the set of critical uplink resources. In some examples, the one or more uplink transmissions include an SRS, a CSI report, or both.

In some examples, the control signaling transmitting manager 1230 may be configured as or otherwise support a means for transmitting, to the UE, additional control signaling indicating one or more models for estimating IDC interference at the UE between communications associated with two or more radio access technologies, where receiving the control message is based on the one or more models.

In some examples, the control message includes an RRC message, a MAC-CE message, or both. In some examples, the first RAT includes an NR access technology, a 5G RAT, or both, and the second RAT includes a Wi-Fi RAT. In some examples, the first RAT includes a first 5G component carrier, and the second RAT includes a second 5G component carrier.

Figure 13:
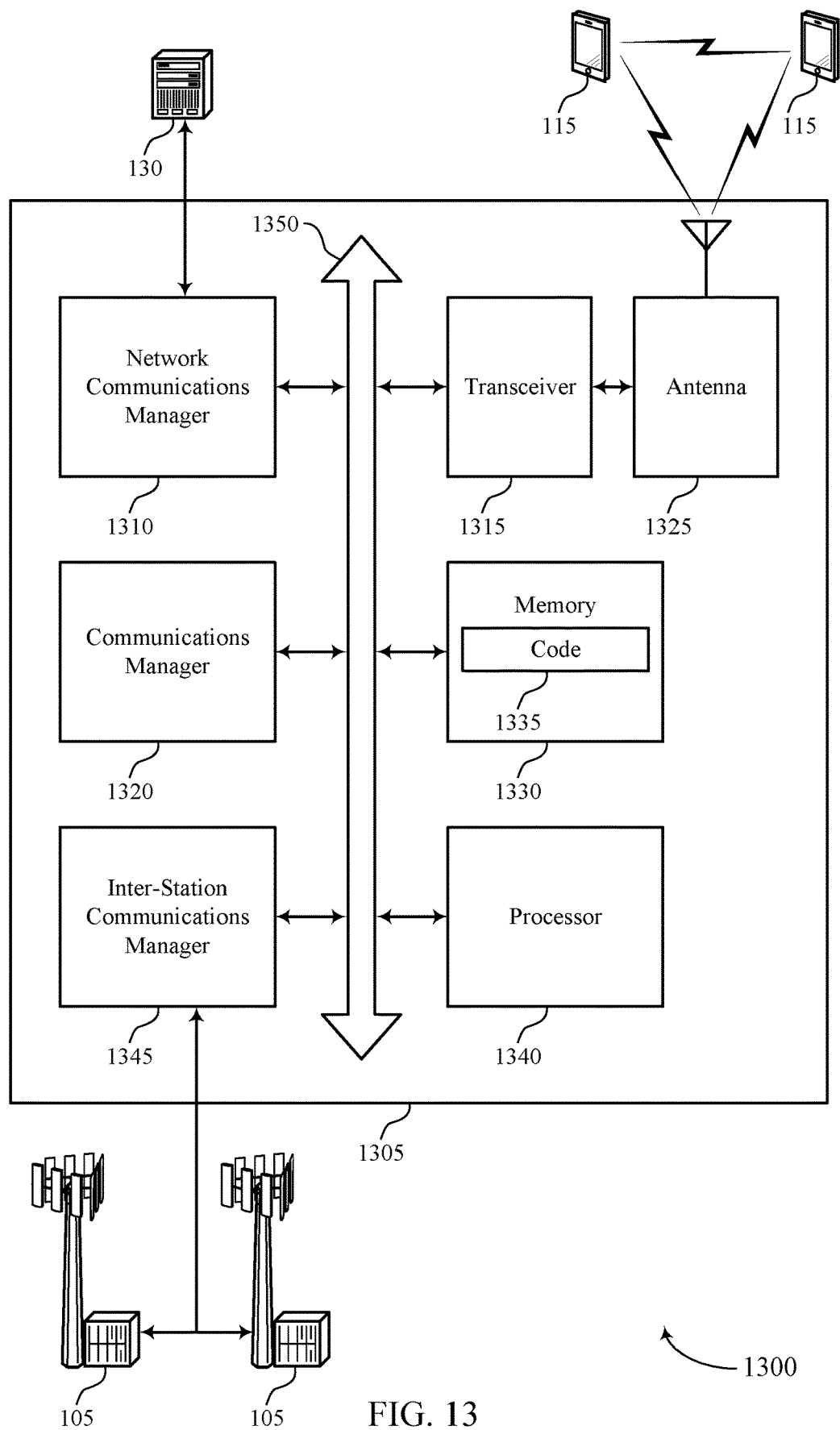
FIG. 13 shows a diagram of a system including a device that supports techniques for IDC interference in accordance with various aspects of the present disclosure.

FIG. 13 shows a diagram of a system 1300 including a device 1305 that supports techniques for IDC interference in accordance with various aspects of the present disclosure. The device 1305 may be an example of or include the components of a device 1005, a device 1105, or a base station 105 as described herein. The device 1305 may communicate wirelessly with one or more base stations 105, UEs 115, or any combination thereof. The device 1305 may include components for bi-directional voice and data communications including components for transmitting and receiving communications, such as a communications manager 1320, a network communications manager 1310, a transceiver 1315, an antenna 1325, a memory 1330, code 1335, a processor 1340, and an inter-station communications manager 1345. These components may be in electronic communication or otherwise coupled (e.g., operatively, communicatively, functionally, electronically, electrically) via one or more buses (e.g., a bus 1350).

The network communications manager 1310 may manage communications with a core network 130 (e.g., via one or more wired backhaul links). For example, the network communications manager 1310 may manage the transfer of data communications for client devices, such as one or more UEs 115.

In some cases, the device 1305 may include a single antenna 1325. However, in some other cases the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include RAM and ROM. The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory.

In some cases, the code 1335 may not be directly executable by the processor 1340 but may cause a computer (e.g., when compiled and executed) to perform functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting techniques for IDC interference). For example, the device 1305 or a component of the device 1305 may include a processor 1340 and memory 1330 coupled to the processor 1340, the processor 1340 and memory 1330 configured to perform various functions described herein.

The inter-station communications manager 1345 may manage communications with other base stations 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communications network technology to provide communication between base stations 105.

The communications manager 1320 may support wireless communication at a base station in accordance with examples as disclosed herein. For example, the communications manager 1320 may be configured as or otherwise support a means for receiving, from a UE using a first RAT and during a first time interval, a control message including an indication associated with a first estimated interference level at the UE for the first RAT caused at least in part by a second RAT, a second estimated interference level at the UE for the second RAT caused at least in part by the first RAT, or a combination thereof. The communications manager 1320 may be configured as or otherwise support a means for transmitting control signaling to the UE using the first RAT based on the first estimated interference level, the second estimated interference level, or a combination thereof. The communications manager 1320 may be configured as or otherwise support a means for communicating with the UE during a second time interval after the first time interval using the first RAT and based on transmitting the control signaling.

By including or configuring the communications manager 1320 in accordance with examples as described herein, the device 1305 may support techniques for estimating and addressing IDC interference at a UE 115. Specifically, techniques described herein may enable a UE 115 to predict IDC interference which is expected to be experienced at the UE 115 before the UE 115 actually experiences the predicted IDC interference. In this regard, techniques described herein may enable the UE 115 to report preferred or non-preferred frequency resources and/or maximum transmit powers so that wireless communications at the UE 115 may be adjusted to prevent the anticipated IDC interference from occurring. By reducing a severity of IDC interference, or preventing IDC interference from occurring, techniques described herein may improve throughput at the UE 115 and improve resource utilization within the wireless communications system.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of techniques for IDC interference as described herein, or the processor 1340 and the memory 1330 may be otherwise configured to perform or support such operations.

Figure 14:
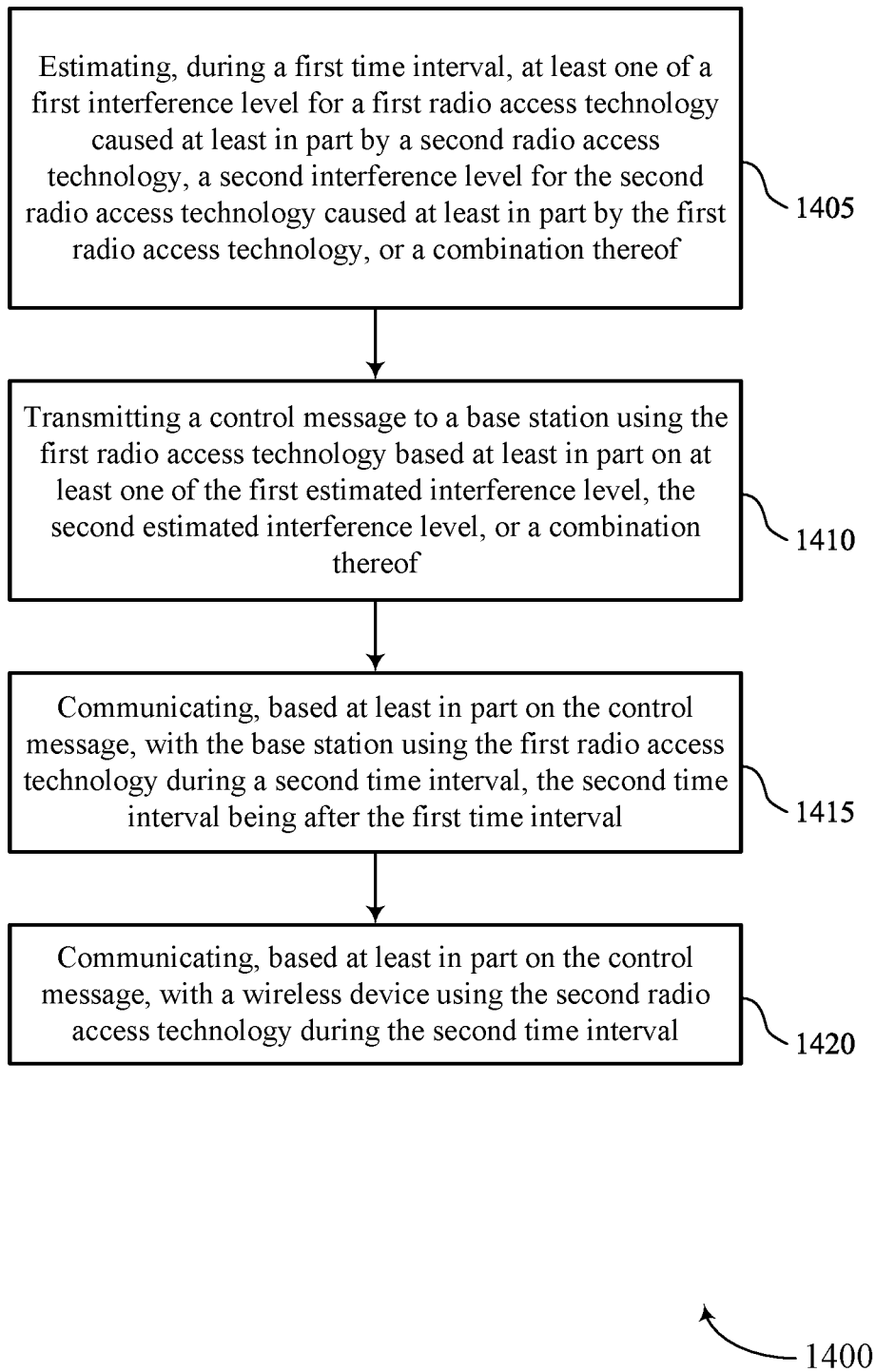
FIGS. 14 through 18 show flowcharts illustrating methods that support techniques for IDC interference in accordance with various aspects of the present disclosure.

FIG. 14 shows a flowchart illustrating a method 1400 that supports techniques for IDC interference in accordance with various aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1405, the method may include estimating, during a first time interval, at least one of a first interference level for a first RAT caused at least in part by a second RAT, a second interference level for the second RAT caused at least in part by the first RAT, or a combination thereof. The operations of 1405 may be performed in accordance with examples as disclosed herein. In some examples, aspects of the operations of 1405 may be performed by an IDC interference manager 825 as described with reference to FIG. 8.

At 1410, the method may include transmitting a control message to a base station using the first RAT based on at least one of the first estimated interference level, the second estimated interference level, or a combination thereof. The operations of 1410 may be performed in accordance with examples as disclosed herein. In some examples, aspects of the operations of 1410 may be performed by a control message transmitting manager 830 as described with reference to FIG. 8.

At 1415, the method may include communicating, based on the control message, with the base station using the first RAT during a second time interval, the second time interval being after the first time interval. The operations of 1415 may be performed in accordance with examples as disclosed herein. In some examples, aspects of the operations of 1415 may be performed by a base station communicating manager 835 as described with reference to FIG. 8.

At 1420, the method may include communicating, based on the control message, with a wireless device using the second RAT during the second time interval. The operations of 1420 may be performed in accordance with examples as disclosed herein. In some examples, aspects of the operations of 1420 may be performed by a wireless device communicating manager 840 as described with reference to FIG. 8.

Figure 15:
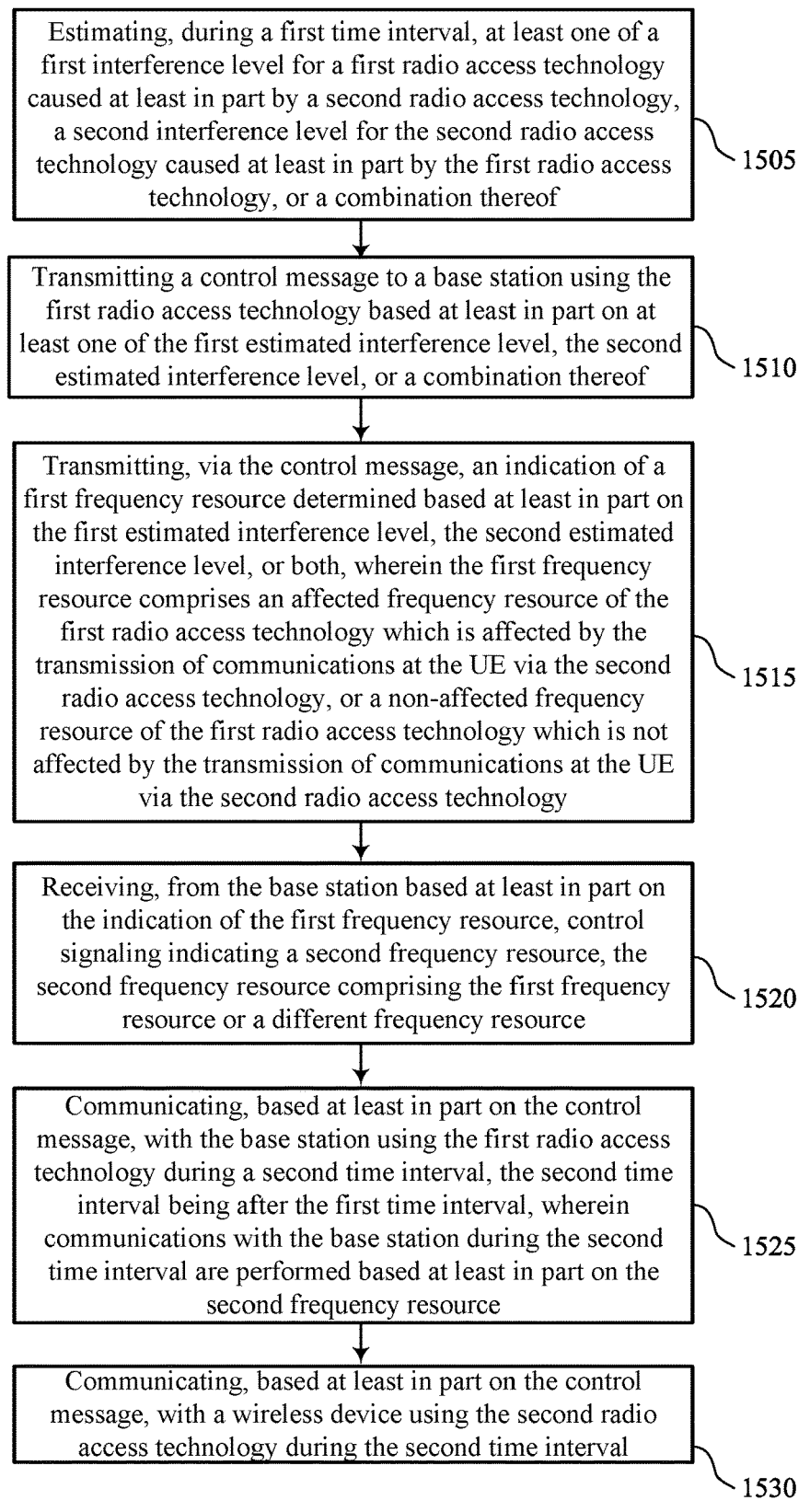

FIG. 15 shows a flowchart illustrating a method 1500 that supports techniques for IDC interference in accordance with various aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1505, the method may include estimating, during a first time interval, at least one of a first interference level for a first RAT caused at least in part by a second RAT, a second interference level for the second RAT caused at least in part by the first RAT, or a combination thereof. The operations of 1505 may be performed in accordance with examples as disclosed herein. In some examples, aspects of the operations of 1505 may be performed by an IDC interference manager 825 as described with reference to FIG. 8.

At 1510, the method may include transmitting a control message to a base station using the first RAT based on at least one of the first estimated interference level, the second estimated interference level, or a combination thereof. The operations of 1510 may be performed in accordance with examples as disclosed herein. In some examples, aspects of the operations of 1510 may be performed by a control message transmitting manager 830 as described with reference to FIG. 8.

At 1515, the method may include transmitting, via the control message, an indication of a first frequency resource determined based on the first estimated interference level, the second estimated interference level, or both, where the first frequency resource includes an affected frequency resource of the first RAT which is affected by the transmission of communications at the UE via the second RAT, or a non-affected frequency resource of the first RAT which is not affected by the transmission of communications at the UE via the second RAT. The operations of 1515 may be performed in accordance with examples as disclosed herein. In some examples, aspects of the operations of 1515 may be performed by a control message transmitting manager 830 as described with reference to FIG. 8.

At 1520, the method may include receiving, from the base station based on the indication of the first frequency resource, control signaling indicating a second frequency resource, the second frequency resource including the first frequency resource or a different frequency resource. The operations of 1520 may be performed in accordance with examples as disclosed herein. In some examples, aspects of the operations of 1520 may be performed by a control signaling receiving manager 845 as described with reference to FIG. 8.

At 1525, the method may include communicating, based on the control message, with the base station using the first RAT during a second time interval, the second time interval being after the first time interval, where communications with the base station during the second time interval are performed based on the second frequency resource. The operations of 1525 may be performed in accordance with examples as disclosed herein. In some examples, aspects of the operations of 1525 may be performed by a base station communicating manager 835 as described with reference to FIG. 8.

At 1530, the method may include communicating, based on the control message, with a wireless device using the second RAT during the second time interval. The operations of 1530 may be performed in accordance with examples as disclosed herein. In some examples, aspects of the operations of 1530 may be performed by a wireless device communicating manager 840 as described with reference to FIG. 8.

Figure 16:
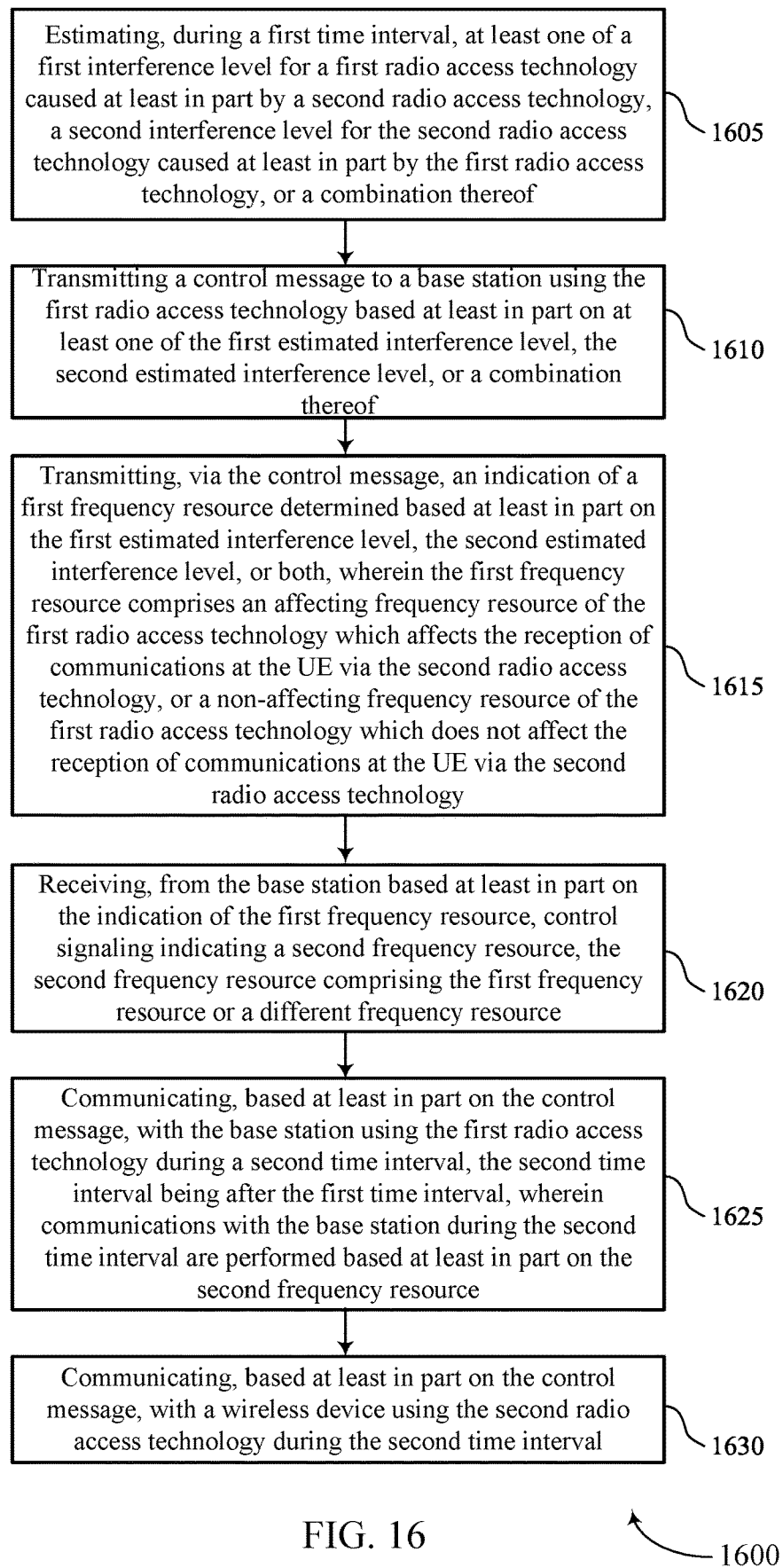

FIG. 16 shows a flowchart illustrating a method 1600 that supports techniques for IDC interference in accordance with various aspects of the present disclosure. The operations of the method 1600 may be implemented by a UE or its components as described herein. For example, the operations of the method 1600 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1605, the method may include estimating, during a first time interval, at least one of a first interference level for a first RAT caused at least in part by a second RAT, a second interference level for the second RAT caused at least in part by the first RAT, or a combination thereof. The operations of 1605 may be performed in accordance with examples as disclosed herein. In some examples, aspects of the operations of 1605 may be performed by an IDC interference manager 825 as described with reference to FIG. 8.

At 1610, the method may include transmitting a control message to a base station using the first RAT based on at least one of the first estimated interference level, the second estimated interference level, or a combination thereof. The operations of 1610 may be performed in accordance with examples as disclosed herein. In some examples, aspects of the operations of 1610 may be performed by a control message transmitting manager 830 as described with reference to FIG. 8.

At 1615, the method may include transmitting, via the control message, an indication of a first frequency resource determined based on the first estimated interference level, the second estimated interference level, or both, where the first frequency resource includes an affecting frequency resource of the first RAT which affects the reception of communications at the UE via the second RAT, or a non-affecting frequency resource of the first RAT which does not affect the reception of communications at the UE via the second RAT. The operations of 1615 may be performed in accordance with examples as disclosed herein. In some examples, aspects of the operations of 1615 may be performed by a control message transmitting manager 830 as described with reference to FIG. 8.

At 1620, the method may include receiving, from the base station based on the indication of the first frequency resource, control signaling indicating a second frequency resource, the second frequency resource including the first frequency resource or a different frequency resource. The operations of 1620 may be performed in accordance with examples as disclosed herein. In some examples, aspects of the operations of 1620 may be performed by a control signaling receiving manager 845 as described with reference to FIG. 8.

At 1625, the method may include communicating, based on the control message, with the base station using the first RAT during a second time interval, the second time interval being after the first time interval, where communications with the base station during the second time interval are performed based on the second frequency resource. The operations of 1625 may be performed in accordance with examples as disclosed herein. In some examples, aspects of the operations of 1625 may be performed by a base station communicating manager 835 as described with reference to FIG. 8.

At 1630, the method may include communicating, based on the control message, with a wireless device using the second RAT during the second time interval. The operations of 1630 may be performed in accordance with examples as disclosed herein. In some examples, aspects of the operations of 1630 may be performed by a wireless device communicating manager 840 as described with reference to FIG. 8.

Figure 17:
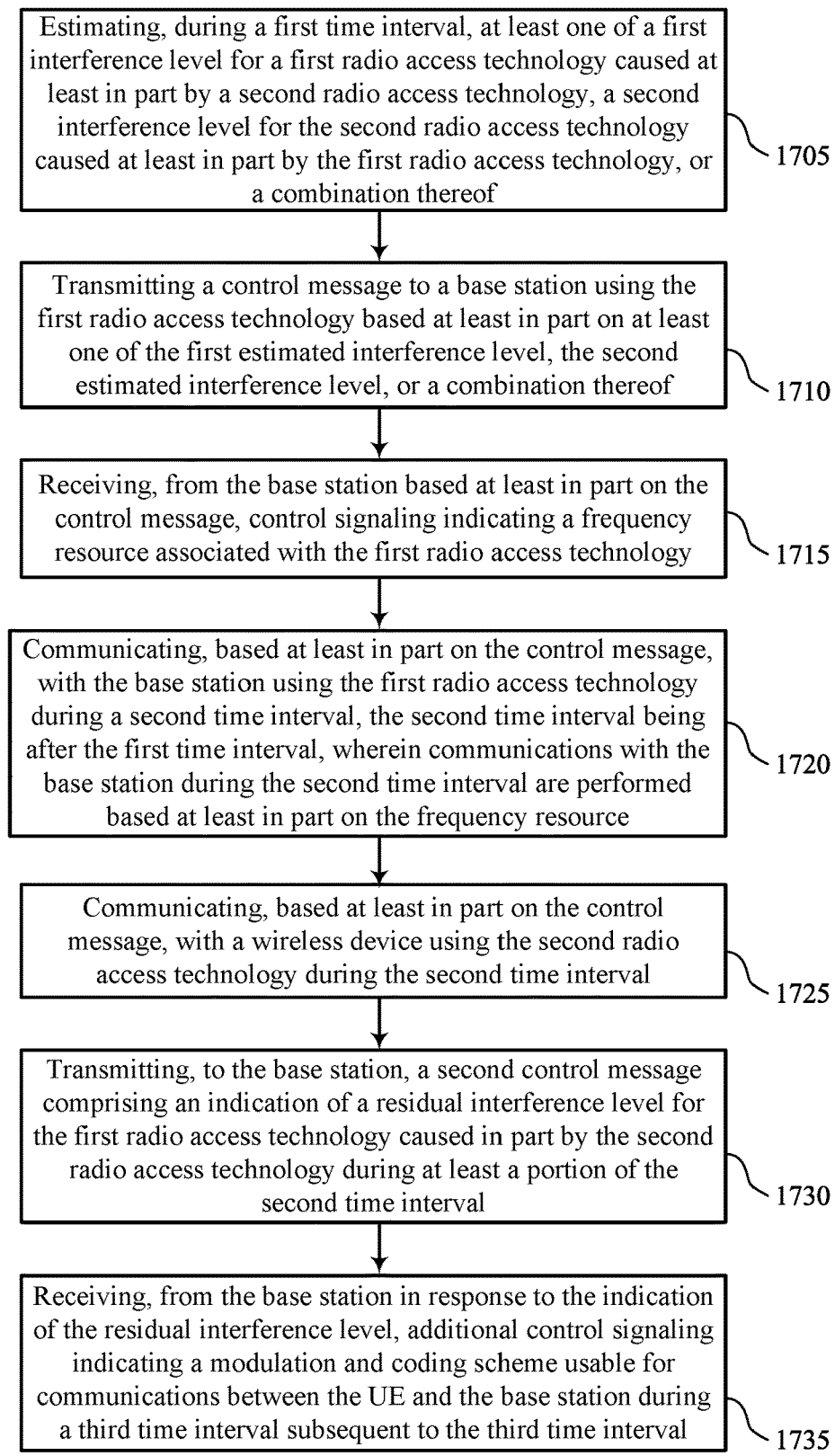

FIG. 17 shows a flowchart illustrating a method 1700 that supports techniques for IDC interference in accordance with various aspects of the present disclosure. The operations of the method 1700 may be implemented by a UE or its components as described herein. For example, the operations of the method 1700 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1705, the method may include estimating, during a first time interval, at least one of a first interference level for a first RAT caused at least in part by a second RAT, a second interference level for the second RAT caused at least in part by the first RAT, or a combination thereof. The operations of 1705 may be performed in accordance with examples as disclosed herein. In some examples, aspects of the operations of 1705 may be performed by an IDC interference manager 825 as described with reference to FIG. 8.

At 1710, the method may include transmitting a control message to a base station using the first RAT based on at least one of the first estimated interference level, the second estimated interference level, or a combination thereof. The operations of 1710 may be performed in accordance with examples as disclosed herein. In some examples, aspects of the operations of 1710 may be performed by a control message transmitting manager 830 as described with reference to FIG. 8.

At 1715, the method may include receiving, from the base station based on the control message, control signaling indicating a frequency resource associated with the first RAT. The operations of 1715 may be performed in accordance with examples as disclosed herein. In some examples, aspects of the operations of 1715 may be performed by a control signaling receiving manager 845 as described with reference to FIG. 8.

At 1720, the method may include communicating, based on the control message, with the base station using the first RAT during a second time interval, the second time interval being after the first time interval, where communications with the base station during the second time interval are performed based on the frequency resource. The operations of 1720 may be performed in accordance with examples as disclosed herein. In some examples, aspects of the operations of 1720 may be performed by a base station communicating manager 835 as described with reference to FIG. 8.

At 1725, the method may include communicating, based on the control message, with a wireless device using the second RAT during the second time interval. The operations of 1725 may be performed in accordance with examples as disclosed herein. In some examples, aspects of the operations of 1725 may be performed by a wireless device communicating manager 840 as described with reference to FIG. 8.

At 1730, the method may include transmitting, to the base station, a second control message including an indication of a residual interference level for the first RAT caused in part by the second RAT during at least a portion of the second time interval. The operations of 1730 may be performed in accordance with examples as disclosed herein. In some examples, aspects of the operations of 1730 may be performed by a control message transmitting manager 830 as described with reference to FIG. 8.

At 1735, the method may include receiving, from the base station in response to the indication of the residual interference level, additional control signaling indicating a modulation and coding scheme usable for communications between the UE and the base station during a third time interval subsequent to the third time interval. The operations of 1735 may be performed in accordance with examples as disclosed herein. In some examples, aspects of the operations of 1735 may be performed by a control signaling receiving manager 845 as described with reference to FIG. 8.

Figure 18:
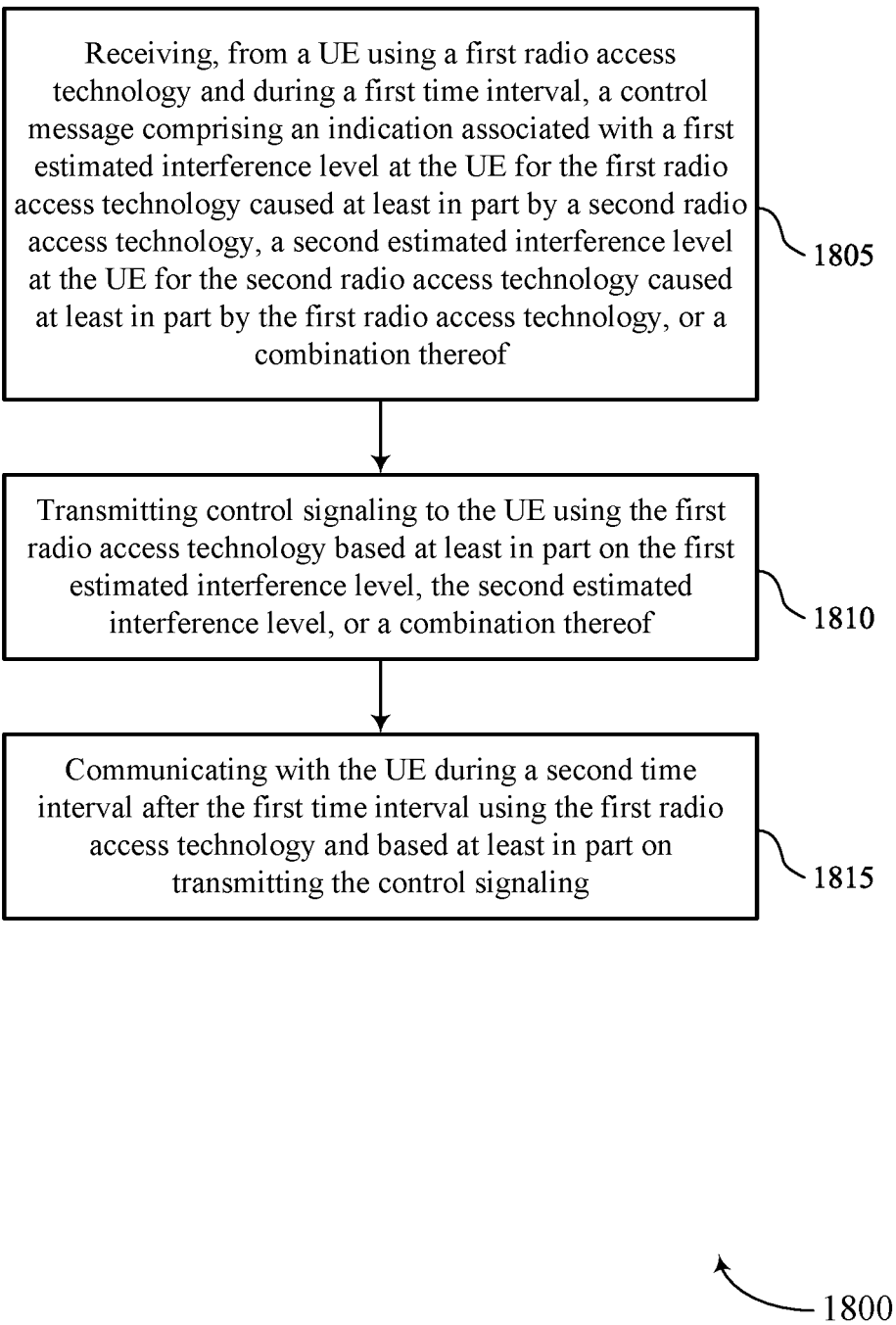

FIG. 18 shows a flowchart illustrating a method 1800 that supports techniques for IDC interference in accordance with various aspects of the present disclosure. The operations of the method 1800 may be implemented by a base station or its components as described herein. For example, the operations of the method 1800 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 1805, the method may include receiving, from a UE using a first RAT and during a first time interval, a control message including an indication associated with a first estimated interference level at the UE for the first RAT caused at least in part by a second RAT, a second estimated interference level at the UE for the second RAT caused at least in part by the first RAT, or a combination thereof. The operations of 1805 may be performed in accordance with examples as disclosed herein. In some examples, aspects of the operations of 1805 may be performed by a control message receiving manager 1225 as described with reference to FIG. 12.

At 1810, the method may include transmitting control signaling to the UE using the first RAT based on the first estimated interference level, the second estimated interference level, or a combination thereof. The operations of 1810 may be performed in accordance with examples as disclosed herein. In some examples, aspects of the operations of 1810 may be performed by a control signaling transmitting manager 1230 as described with reference to FIG. 12.

At 1815, the method may include communicating with the UE during a second time interval after the first time interval using the first RAT and based on transmitting the control signaling. The operations of 1815 may be performed in accordance with examples as disclosed herein. In some examples, aspects of the operations of 1815 may be performed by a UE communicating manager 1235 as described with reference to FIG. 12.

The following provides an overview of aspects of the present disclosure:

Aspect 1: A method for wireless communication at a UE, comprising: estimating, during a first time interval, at least one of a first interference level for a first radio access technology caused at least in part by a second radio access technology, a second interference level for the second radio access technology caused at least in part by the first radio access technology, or a combination thereof; transmitting a control message to a base station using the first radio access technology based at least in part on at least one of the first estimated interference level, the second estimated interference level, or a combination thereof; communicating, based at least in part on the control message, with the base station using the first radio access technology during a second time interval, the second time interval being after the first time interval; and communicating, based at least in part on the control message, with a wireless device using the second radio access technology during the second time interval.

Aspect 2: The method of aspect 1, further comprising: transmitting, via the control message, an indication of a first frequency resource determined based at least in part on the first estimated interference level, the second estimated interference level, or both, wherein the first frequency resource comprises an affected frequency resource of the first radio access technology which is affected by the transmission of communications at the UE via the second radio access technology, or a non-affected frequency resource of the first radio access technology which is not affected by the transmission of communications at the UE via the second radio access technology; and receiving, from the base station based at least in part on the indication of the first frequency resource, control signaling indicating a second frequency resource, the second frequency resource comprising the first frequency resource or a different frequency resource, wherein communications with the base station during the second time interval are performed based at least in part on the second frequency resource.

Aspect 3: The method of aspect 2, wherein the indication of the first frequency resource comprises a BWP identifier, a identifier of a resource block region, or a combination thereof.

Aspect 4: The method of any of aspects 2 through 3, wherein the control signaling comprises an indication for the UE to switch from a first BWP to a second BWP including the second frequency resource, or the control signaling comprises a DCI message comprising a frequency domain resource allocation associated with the second frequency resource Aspect 5: The method of any of aspects 1 through 4, further comprising: transmitting, via the control message, an indication of a first frequency resource determined based at least in part on the first estimated interference level, the second estimated interference level, or both, wherein the first frequency resource comprises an affecting frequency resource of the first radio access technology which affects the reception of communications at the UE via the second radio access technology, or a non-affecting frequency resource of the first radio access technology which does not affect the reception of communications at the UE via the second radio access technology; and receiving, from the base station based at least in part on the indication of the first frequency resource, control signaling indicating a second frequency resource, the second frequency resource comprising the first frequency resource or a different frequency resource, wherein communications with the base station during the second time interval are performed based at least in part on the second frequency resource.

Aspect 6: The method of any of aspects 1 through 5, further comprising: receiving, from the base station based at least in part on the control message, control signaling indicating a frequency resource associated with the first radio access technology, wherein communications with the base station during the second time interval are performed based at least in part on the frequency resource; transmitting, to the base station, a second control message comprising an indication of a residual interference level for the first radio access technology caused in part by the second radio access technology during at least a portion of the second time interval; and receiving, from the base station in response to the indication of the residual interference level, additional control signaling indicating a modulation and coding scheme usable for communications between the UE and the base station during a third time interval subsequent to the third time interval.

Aspect 7: The method of any of aspects 1 through 6, further comprising: estimating, during the second time interval, a third interference level for the first radio access technology caused in part by the second radio access technology, a fourth interference level for the second radio access technology caused in part by the first radio access technology, or a combination thereof; and transmitting, to the base station, a third control message indicating a frequency resource based at least in part on the third estimated interference level satisfying a first interference threshold, the fourth estimated interference level satisfying a second threshold interference threshold, or both.

Aspect 8: The method of any of aspects 1 through 7, further comprising: transmitting, via the control message, a request for the base station to modify a frequency resource associated with communications performed between the UE and the base station based at least in part on the first estimated interference level, the second estimated interference level, or both, wherein communicating with the base station during the second time interval is based at least in part on the request.

Aspect 9: The method of any of aspects 1 through 8, wherein estimating the first interference level comprises: identifying a first transmission power, a first frequency resource, or both, associated with communications performed using the second radio access technology; identifying a second transmission power, a second frequency resource, or both, associated with communications performed using the second radio access technology; and estimating the first interference level, the second interference level, or both, based at least in part on the first transmission power, the first frequency resource, the second transmission power, the second frequency resource, or a combination thereof, and in accordance with one or more models for estimating IDC interference at the UE between communications associated with two or more radio access technologies.

Aspect 10: The method of any of aspects 1 through 9, wherein transmitting the control message comprises: transmitting the control message based at least in part on the first estimated interference level satisfying a first interference threshold, the second estimated interference level satisfying a second interference threshold, or both.

Aspect 11: The method of any of aspects 1 through 10, wherein transmitting the control message comprises: transmitting, via the control message, an indication of a maximum transmit power at the UE associated with communications performed via the first radio access technology; and receiving, from the base station based at least in part on the indication of the maximum transmit power, a second control message indicating a transmit power for communications at the UE, wherein communications with the base station during the second time interval are performed based at least in part on the indicated transmit power.

Aspect 12: The method of any of aspects 1 through 11, further comprising: receiving, from the base station, additional control signaling indicating a set of critical uplink resources associated with the first radio access technology, wherein communicating with the base station during the second time interval comprises transmitting one or more uplink transmissions to the base station within the set of critical uplink resources.

Aspect 13: The method of aspect 12, wherein the one or more uplink transmissions comprise a sounding reference signal, a channel state information report, or both.

Aspect 14: The method of any of aspects 1 through 13, further comprising: communicating with the base station using the first radio access technology and with the wireless device using the second radio access technology during a third time interval which is prior to the first time interval; estimating, during the third time interval, a third interference level for the first radio access technology caused in part by the second radio access technology, a fourth interference level for the second radio access technology caused in part by the first radio access technology, or a combination thereof; and generating one or more models for estimating IDC interference at the UE between communications associated with two or more radio access technologies, wherein the estimating during the second time interval is performed based at least in part on the one or more models.

Aspect 15: The method of any of aspects 1 through 14, wherein the control message comprises a radio resource control (RRC) message, a medium access control-control element (MAC-CE) message, or both.

Aspect 16: The method of any of aspects 1 through 15, wherein the first radio access technology comprises an NR access technology, a 5G radio access technology, or both, and the second radio access technology comprises a Wi-Fi radio access technology, or the first radio access technology comprises a first 5G component carrier, and the second radio access technology comprises a second 5G component carrier.

Aspect 17: A method for wireless communication at a base station, comprising: receiving, from a UE using a first radio access technology and during a first time interval, a control message comprising an indication associated with a first estimated interference level at the UE for the first radio access technology caused at least in part by a second radio access technology, a second estimated interference level at the UE for the second radio access technology caused at least in part by the first radio access technology, or a combination thereof; transmitting control signaling to the UE using the first radio access technology based at least in part on the first estimated interference level, the second estimated interference level, or a combination thereof; and communicating with the UE during a second time interval after the first time interval using the first radio access technology and based at least in part on transmitting the control signaling.

Aspect 18: The method of aspect 17, further comprising: receiving, via the control message, an indication of a first frequency resource determined based at least in part on the first estimated interference level, the second estimated interference level, or both, wherein the first frequency resource comprises an affected frequency resource of the first radio access technology which is affected by the transmission of communications at the UE via the second radio access technology, or a non-affected frequency resource of the first radio access technology which is not affected by the transmission of communications at the UE via the second radio access technology; and transmitting, via the control signaling based at least in part on the indication of the first frequency resource, an indication of a second frequency resource, the second frequency resource comprising the first frequency resource or a different frequency resource, wherein communications with the UE during the second time interval are performed based at least in part on the second frequency resource.

Aspect 19: The method of aspect 18, wherein the indication of the first frequency resource comprises a BWP identifier, a identifier of a resource block region, or a combination thereof.

Aspect 20: The method of any of aspects 18 through 19, wherein the control signaling comprises an indication for the UE to switch from a first BWP to a second BWP including the second frequency resource, or the control signaling comprises a DCI message comprising a frequency domain resource allocation associated with the second frequency resource.

Aspect 21: The method of any of aspects 17 through 20, further comprising: receiving, via the control message, an indication of a first frequency resource determined based at least in part on the first estimated interference level, the second estimated interference level, or both, wherein the first frequency resource comprises an affecting frequency resource of the first radio access technology which affects the reception of communications at the UE via the second radio access technology, or a non-affecting frequency resource of the first radio access technology does not affect the reception of communications at the UE via the second radio access technology; and transmitting, via the control signaling based at least in part on the indication of the first frequency resource, an indication of a second frequency resource, the second frequency resource comprising the first frequency resource or a different frequency resource, wherein communications with the UE during the second time interval are performed based at least in part on the second frequency resource.

Aspect 22: The method of any of aspects 17 through 21, further comprising: transmitting, to the UE based at least in part on the control message, control signaling indicating a frequency resource associated with the first radio access technology, wherein communications with the UE during the second time interval are performed based at least in part on the frequency resource; receiving, from the UE, a second control message comprising an indication of a residual interference level for the first radio access technology caused in part by the second radio access technology during at least a portion of the second time interval; and transmitting, to the UE in response to the indication of the residual interference level, additional control signaling indicating a modulation and coding scheme usable for communications between the UE and the base station during a third time interval subsequent to the second time interval.

Aspect 23: The method of any of aspects 17 through 22, further comprising: receiving, from the UE, a third control message indicating a frequency resource based at least in part on a third estimated interference level at the UE for the first radio access technology caused in part by the second radio access technology satisfying a first interference threshold, a fourth estimated interference level at the UE for the second radio access technology caused in part by the first radio access technology satisfying a second threshold interference threshold, or a combination thereof.

Aspect 24: The method of any of aspects 17 through 23, further comprising: receiving, via the control message, a request for the base station to modify a frequency resource associated with communications performed between the UE and the base station based at least in part on the first estimated interference level, the second estimated interference level, or both, wherein communicating with the UE during the second time interval is based at least in part on the request.

Aspect 25: The method of any of aspects 17 through 24, wherein receiving the control message comprises: receiving the control message based at least in part on the first estimated interference level satisfying a first interference threshold, the second estimated interference level satisfying a second interference threshold, or both.

Aspect 26: The method of any of aspects 17 through 25, wherein receiving the control message comprises: receiving, via the control message, an indication of a maximum transmit power at the UE associated with communications performed via the first radio access technology; and transmitting, to the UE based at least in part on the indication of the maximum transmit power, a second control message indicating a transmit power for communications at the UE, wherein communications with the UE during the second time interval are performed based at least in part on the indicated transmit power.

Aspect 27: The method of any of aspects 17 through 26, further comprising: transmitting, to the UE, additional control signaling indicating a set of critical uplink resources associated with the first radio access technology, wherein communicating with the UE during the second time interval comprises receiving one or more uplink transmissions from the UE within the set of critical uplink resources.

Aspect 28: The method of aspect 27, wherein the one or more uplink transmissions comprise a sounding reference signal, a channel state information report, or both.

Aspect 29: The method of any of aspects 17 through 28, further comprising: transmitting, to the UE, additional control signaling indicating one or more models for estimating IDC interference at the UE between communications associated with two or more radio access technologies, wherein receiving the control message is based at least in part on the one or more models.

Aspect 30: The method of any of aspects 17 through 29, wherein the control message comprises an RRC message, a MAC-CE message, or both.

Aspect 31: The method of any of aspects 17 through 30, wherein the first radio access technology comprises an NR access technology, a 5G radio access technology, or both, and the second radio access technology comprises a Wi-Fi radio access technology, or the first radio access technology comprises a first 5G component carrier, and the second radio access technology comprises a second 5G component carrier.

Aspect 32: An apparatus for wireless communication at a UE, comprising a processor; memory coupled with the processor; and instructions stored in the memory and executable by the processor to cause the apparatus to perform a method of any of aspects 1 through 16.

Aspect 33: An apparatus for wireless communication at a UE, comprising at least one means for performing a method of any of aspects 1 through 16.

Aspect 34: A non-transitory computer-readable medium storing code for wireless communication at a UE, the code comprising instructions executable by a processor to perform a method of any of aspects 1 through 16.

Aspect 35: An apparatus for wireless communication at a base station, comprising a processor; memory coupled with the processor; and instructions stored in the memory and executable by the processor to cause the apparatus to perform a method of any of aspects 17 through 31.

Aspect 36: An apparatus for wireless communication at a base station, comprising at least one means for performing a method of any of aspects 17 through 31.

Aspect 37: A non-transitory computer-readable medium storing code for wireless communication at a base station, the code comprising instructions executable by a processor to perform a method of any of aspects 17 through 31.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
    estimating, during a first time interval using one or more models for predicting in-device coexistence interference at the UE between communications associated with two or more radio access technologies, at least one of a first predicted interference level for a first radio access technology caused at least in part by a second radio access technology during a second time interval subsequent to the first time interval, a second predicted interference level for the second radio access technology caused at least in part by the first radio access technology during the second time interval, or a combination thereof;
    transmitting, during the first time interval, a control message to a base station using the first radio access technology, wherein the control message includes an indication for the base station to modify a frequency resource associated with communications to be performed between the UE and the base station during the second time interval based at least in part on at least one of the first predicted interference level, the second predicted interference level, or a combination thereof;
    communicating, based at least in part on the control message and the indication, with the base station using the first radio access technology during the second time interval; and
    communicating, based at least in part on the control message, with a wireless device using the second radio access technology during the second time interval.

2. The method of claim 1, further comprising:
    transmitting, via the control message, an indication of a first frequency resource determined based at least in part on the first predicted interference level, the second predicted interference level, or both, wherein the first frequency resource comprises an affected frequency resource of the first radio access technology which is affected by the transmission of communications at the UE via the second radio access technology, or a non-affected frequency resource of the first radio access technology which is not affected by the transmission of communications at the UE via the second radio access technology; and
    receiving, from the base station based at least in part on the indication of the first frequency resource, control signaling indicating a second frequency resource, the second frequency resource comprising the first frequency resource or a different frequency resource, wherein communications with the base station during the second time interval are performed based at least in part on the second frequency resource.

3. The method of claim 2, wherein the indication of the first frequency resource comprises a bandwidth part identifier, a identifier of a resource block region, or a combination thereof.

4. The method of claim 2, wherein:
    the control signaling comprises an indication for the UE to switch from a first bandwidth part to a second bandwidth part including the second frequency resource, or
    the control signaling comprises a downlink control information message comprising a frequency domain resource allocation associated with the second frequency resource.

5. The method of claim 1, further comprising:
    transmitting, via the control message, an indication of a first frequency resource determined based at least in part on the first predicted interference level, the second predicted interference level, or both, wherein the first frequency resource comprises an affecting frequency resource of the first radio access technology which affects the reception of communications at the UE via the second radio access technology during the second time interval, or a non-affecting frequency resource of the first radio access technology which does not affect the reception of communications at the UE via the second radio access technology during the second time interval; and
    receiving, from the base station based at least in part on the indication of the first frequency resource, control signaling indicating a second frequency resource, the second frequency resource comprising the first frequency resource or a different frequency resource, wherein communications with the base station during the second time interval are performed based at least in part on the second frequency resource.

6. The method of claim 1, further comprising:
    receiving, from the base station based at least in part on the control message, control signaling indicating a frequency resource associated with the first radio access technology, wherein communications with the base station during the second time interval are performed based at least in part on the frequency resource;
    transmitting, to the base station, a second control message comprising an indication of a residual interference level for the first radio access technology caused in part by the second radio access technology during at least a portion of the second time interval; and
    receiving, from the base station in response to the indication of the residual interference level, additional control signaling indicating a modulation and coding scheme usable for communications between the UE and the base station during a third time interval subsequent to the third time interval.

7. The method of claim 1, further comprising:
    estimating, during the second time interval, a third predicted interference level for the first radio access technology caused in part by the second radio access technology during a third time interval subsequent to the second time interval, a fourth predicted interference level for the second radio access technology caused in part by the first radio access technology during the third time interval, or a combination thereof; and
    transmitting, to the base station prior to the third time interval, a third control message indicating a frequency resource based at least in part on the third predicted interference level satisfying a first interference threshold, the fourth predicted interference level satisfying a second threshold interference threshold, or both.

8. The method of claim 1, wherein estimating the first predicted interference level comprises:
identifying a first transmission power, a first frequency resource, or both, associated with communications to be performed during the second time interval using the second radio access technology;
identifying a second transmission power, a second frequency resource, or both, associated with communications to be performed during the second time interval using the second radio access technology; and
estimating the first predicted interference level, the second predicted interference level, or both, based at least in part on the first transmission power, the first frequency resource, the second transmission power, the second frequency resource, or a combination thereof, and in accordance with one or more models for estimating in-device coexistence interference at the UE between communications associated with two or more radio access technologies.

9. The method of claim 1, wherein transmitting the control message comprises:
transmitting the control message based at least in part on the first predicted interference level satisfying a first interference threshold, the second predicted interference level satisfying a second interference threshold, or both.

10. The method of claim 1, wherein transmitting the control message comprises:
transmitting, via the control message, an indication of a maximum transmit power at the UE associated with communications performed via the first radio access technology; and
receiving, from the base station based at least in part on the indication of the maximum transmit power, a second control message indicating a transmit power for communications at the UE, wherein communications with the base station during the second time interval are performed based at least in part on the indicated transmit power.

11. The method of claim 1, further comprising:
receiving, from the base station, additional control signaling indicating a set of critical uplink resources associated with the first radio access technology, wherein communicating with the base station during the second time interval comprises transmitting one or more uplink transmissions to the base station within the set of critical uplink resources.

12. The method of claim 11, wherein the one or more uplink transmissions comprise a sounding reference signal, a channel state information report, or both.

13. The method of claim 1, further comprising:
communicating with the base station using the first radio access technology and with the wireless device using the second radio access technology during a third time interval which is prior to the first time interval;
estimating, during the third time interval, a third interference level for the first radio access technology caused in part by the second radio access technology during the third time interval, a fourth interference level for the second radio access technology caused in part by the first radio access technology during the third time interval, or a combination thereof; and
generating the one or more models for estimating in-device coexistence interference at the UE between communications associated with two or more radio access technologies.

14. The method of claim 1, wherein the control message comprises a radio resource control message, a medium access control-control element message, or both.

15. The method of claim 1, wherein:
the first radio access technology comprises a New Radio (NR) access technology, a fifth generation (5G) radio access technology, or both, and the second radio access technology comprises a Wi-Fi radio access technology, or
the first radio access technology comprises a first 5G component carrier, and the second radio access technology comprises a second 5G component carrier.

16. A method for wireless communication at a base station, comprising:
receiving, from a user equipment (UE) using a first radio access technology and during a first time interval, a control message comprising an indication for the base station to modify a frequency resource associated with communications to be performed between the UE and the base station during a second time interval subsequent to the first time interval based at least in part on a first predicted interference level at the UE for the first radio access technology caused at least in part by a second radio access technology during the second time interval, a second predicted interference level at the UE for the second radio access technology caused at least in part by the first radio access technology during the second time interval, or a combination thereof, wherein the first predicted interference level, the second predicted interference level, or both, are based at least in part on one or more models for predicting in-device coexistence interference at the UE between communications associated with two or more radio access technologies;
transmitting, during the first time interval, control signaling to the UE using the first radio access technology based at least in part on the first predicted interference level, the second predicted interference level, or a combination thereof; and
communicating with the UE during the second time interval using the first radio access technology and based at least in part on transmitting the control signaling and based at least in part on the indication.

17. The method of claim 16, further comprising:
receiving, via the control message, an indication of a first frequency resource determined based at least in part on the first predicted interference level, the second predicted interference level, or both, wherein the first frequency resource comprises an affected frequency resource of the first radio access technology which is affected by the transmission of communications at the UE via the second radio access technology during the second time interval, or a non-affected frequency resource of the first radio access technology which is not affected by the transmission of communications at the UE via the second radio access technology during the second time interval; and
transmitting, via the control signaling based at least in part on the indication of the first frequency resource, an indication of a second frequency resource, the second frequency resource comprising the first frequency resource or a different frequency resource, wherein communications with the UE during the second time interval are performed based at least in part on the second frequency resource.

18. The method of claim 17, wherein the indication of the first frequency resource comprises a bandwidth part identifier, a identifier of a resource block region, or a combination thereof.

19. The method of claim 17, wherein:
the control signaling comprises an indication for the UE to switch from a first bandwidth part to a second bandwidth part including the second frequency resource, or
the control signaling comprises a downlink control information message comprising a frequency domain resource allocation associated with the second frequency resource.

20. The method of claim 16, further comprising:
receiving, via the control message, an indication of a first frequency resource determined based at least in part on the first predicted interference level, the second predicted interference level, or both, wherein the first frequency resource comprises an affecting frequency resource of the first radio access technology which affects the reception of communications at the UE via the second radio access technology during the second time interval, or a non-affecting frequency resource of the first radio access technology does not affect the reception of communications at the UE via the second radio access technology during the second time interval; and
transmitting, via the control signaling based at least in part on the indication of the first frequency resource, an indication of a second frequency resource, the second frequency resource comprising the first frequency resource or a different frequency resource, wherein communications with the UE during the second time interval are performed based at least in part on the second frequency resource.

21. The method of claim 16, further comprising:
transmitting, to the UE based at least in part on the control message, control signaling indicating a frequency resource associated with the first radio access technology, wherein communications with the UE during the second time interval are performed based at least in part on the frequency resource;
receiving, from the UE, a second control message comprising an indication of a residual interference level for the first radio access technology caused in part by the second radio access technology during at least a portion of the second time interval; and
transmitting, to the UE in response to the indication of the residual interference level, additional control signaling indicating a modulation and coding scheme usable for communications between the UE and the base station during a third time interval subsequent to the second time interval.

22. The method of claim 16, further comprising:
receiving, from the UE, a third control message indicating a frequency resource based at least in part on a third predicted interference level at the UE for the first radio access technology caused in part by the second radio access technology satisfying a first interference threshold, a fourth predicted interference level at the UE for the second radio access technology caused in part by the first radio access technology satisfying a second threshold interference threshold, or a combination thereof.

23. The method of claim 16, wherein receiving the control message comprises:
receiving the control message based at least in part on the first predicted interference level satisfying a first interference threshold, the second predicted interference level satisfying a second interference threshold, or both.

24. The method of claim 16, wherein receiving the control message comprises:
receiving, via the control message, an indication of a maximum transmit power at the UE associated with communications performed via the first radio access technology; and
transmitting, to the UE based at least in part on the indication of the maximum transmit power, a second control message indicating a transmit power for communications at the UE, wherein communications with the UE during the second time interval are performed based at least in part on the indicated transmit power.

25. The method of claim 16, further comprising:
transmitting, to the UE, additional control signaling indicating a set of critical uplink resources associated with the first radio access technology, wherein communicating with the UE during the second time interval comprises receiving one or more uplink transmissions from the UE within the set of critical uplink resources.

26. The method of claim 25, wherein the one or more uplink transmissions comprise a sounding reference signal, a channel state information report, or both.

27. An apparatus for wireless communication at a user equipment (UE), comprising:
a processor;
memory coupled with the processor; and
instructions stored in the memory and executable by the processor to cause the apparatus to:
estimate, during a first time interval using one or more models for predicting in-device coexistence interference at the UE between communications associated with two or more radio access technologies, at least one of a first predicted interference level for a first radio access technology caused at least in part by a second radio access technology during a second time interval subsequent to the first time interval, a second predicted interference level for the second radio access technology caused at least in part by the first radio access technology during the second time interval, or a combination thereof;
transmit, during the first time interval, a control message to a base station using the first radio access technology, wherein the control message includes an indication for the base station to modify a frequency resource associated with communications to be performed between the UE and the base station during the second time interval based at least in part on at least one of the first predicted interference level, the second predicted interference level, or a combination thereof;
communicate, based at least in part on the control message and the indication, with the base station using the first radio access technology during the second time interval; and
communicate, based at least in part on the control message, with a wireless device using the second radio access technology during the second time interval.

28. An apparatus for wireless communication at a base station, comprising:

a processor;
memory coupled with the processor; and
instructions stored in the memory and executable by the processor to cause the apparatus to:
receive, from a user equipment (UE) using a first radio access technology and during a first time interval, a control message comprising an indication for the base station to modify a frequency resource associated with communications to be performed between the UE and the base station during a second time interval subsequent to the first time interval based at least in part on a first predicted interference level at the UE for the first radio access technology caused at least in part by a second radio access technology during the second time interval, a second predicted interference level at the UE for the second radio access technology caused at least in part by the first radio access technology during the second time interval, or a combination thereof, wherein the first predicted interference level, the second predicted interference level, or both, are based at least in part on one or more models for predicting in-device coexistence interference at the UE between communications associated with two or more radio access technologies;
transmit, during the first time interval, control signaling to the UE using the first radio access technology based at least in part on the first predicted interference level, the second predicted interference level, or a combination thereof; and
communicate with the UE during the second time interval using the first radio access technology and based at least in part on transmitting the control signaling and based at least in part on the indication.

* * * * *